(12) United States Patent
Ho et al.

(10) Patent No.: US 9,679,295 B2
(45) Date of Patent: Jun. 13, 2017

(54) METHODS AND APPARATUSES FOR SORTING LISTS FOR PRESENTATION

(75) Inventors: Kelvin Ho, San Francisco, CA (US);
Ron Hirson, San Francisco, CA (US);
Ebbe Altberg, Mill Valley, CA (US);
Scott Faber, San Francisco, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 237 days.

(21) Appl. No.: 13/179,121

(22) Filed: Jul. 8, 2011

(65) Prior Publication Data

US 2011/0264517 A1 Oct. 27, 2011

Related U.S. Application Data

(63) Continuation of application No. 11/072,147, filed on Mar. 3, 2005, now Pat. No. 7,979,308.

(60) Provisional application No. 60/656,637, filed on Feb. 25, 2005.

(51) Int. Cl.
*G06Q 30/00* (2012.01)
*G06Q 30/02* (2012.01)
*G05B 19/418* (2006.01)

(52) U.S. Cl.
CPC ......... *G06Q 30/02* (2013.01); *G06Q 30/0247* (2013.01); *G06Q 30/0257* (2013.01); *G06Q 30/0269* (2013.01); *G06Q 30/0273* (2013.01); *G06Q 30/0274* (2013.01); *G06Q 30/0275* (2013.01); *G06Q 30/0276* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 4,313,035 | A | 1/1982 | Jordan et al. |
| 4,577,065 | A | 3/1986 | Frey et al. |
| 4,631,428 | A | 12/1986 | Grimes |
| 4,645,873 | A | 2/1987 | Chomet |
| 4,677,434 | A | 6/1987 | Fascenda |
| 4,723,283 | A | 2/1988 | Nagasawa et al. |

(Continued)

FOREIGN PATENT DOCUMENTS

| | | |
|---|---|---|
| AU | 699785 | 5/1995 |
| AU | 2004202940 A1 | 4/2005 |

(Continued)

OTHER PUBLICATIONS

"Phones for Everyone Satellite Telephony". Peter J Brown. (1998). Via Satellite. vol. 13, issue 8. Aug. 1, 1998.*

(Continued)

*Primary Examiner* — Victoria Vanderhorst
*Assistant Examiner* — Maria Vanderhorst
(74) *Attorney, Agent, or Firm* — Alston & Bird LLP

(57) ABSTRACT

Methods and apparatuses for sorting seller listings or advertisements of a seller network. In one embodiment, a method includes: determining an indicator of potential revenue for a first party from price information of a list of entities, wherein revenue generated according to the price information of at least some of the list of entities is to be split among a plurality of parties; and, sorting the list of entities into a first list based at least partially on the indicator of potential revenue.

18 Claims, 12 Drawing Sheets

(56) References Cited

U.S. PATENT DOCUMENTS

| | | |
|---|---|---|
| 4,751,669 A | 6/1988 | Sturgis et al. |
| 4,752,675 A | 6/1988 | Zetmeir |
| 4,847,890 A | 7/1989 | Solomon et al. |
| 4,850,007 A | 7/1989 | Marino et al. |
| 4,963,995 A | 10/1990 | Lang |
| 5,057,932 A | 10/1991 | Lang |
| 5,058,152 A | 10/1991 | Solomon et al. |
| 5,148,474 A | 9/1992 | Haralambopoulos et al. |
| 5,155,743 A | 10/1992 | Jacobs |
| 5,164,839 A | 11/1992 | Lang |
| 5,262,875 A | 11/1993 | Mincer et al. |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,440,334 A | 8/1995 | Walters et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Guo |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,696,965 A | 12/1997 | Dedrick |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,793,851 A | 8/1998 | Albertson |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,963,202 A | 10/1999 | Polish |
| 5,963,861 A | 10/1999 | Hanson |
| 5,974,141 A | 10/1999 | Saito |
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | d'Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,108,704 A | 8/2000 | Hutton et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,216,111 B1 | 4/2001 | Walker et al. |
| 6,223,165 B1 | 4/2001 | Lauffer |
| 6,230,287 B1 | 5/2001 | Pinard et al. |
| 6,233,566 B1 | 5/2001 | Levine et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |

(56) References Cited

U.S. PATENT DOCUMENTS

| | | |
|---|---|---|
| 6,275,490 B1 | 8/2001 | Mattaway et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,323,894 B1 | 11/2001 | Katz |
| 6,327,572 B1 | 12/2001 | Morton et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,430,276 B1 | 8/2002 | Bouvier et al. |
| 6,434,527 B1 | 8/2002 | Horvitz |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,482,156 B2 | 11/2002 | Iliff |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,516,057 B2 | 2/2003 | Meek et al. |
| 6,523,010 B2 | 2/2003 | Lauffer |
| 6,529,878 B2 | 3/2003 | De Rafael et al. |
| 6,529,946 B2 | 3/2003 | Yokono et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,704,403 B2 | 3/2004 | Lurie et al. |
| 6,731,736 B2 | 5/2004 | Meek et al. |
| 6,735,588 B2 | 5/2004 | Kim et al. |
| 6,757,364 B2 | 6/2004 | Newkirk |
| 6,757,710 B2 | 6/2004 | Reed |
| 6,760,537 B2 | 7/2004 | Mankovitz |
| 6,769,020 B2 | 7/2004 | Miyazaki et al. |
| 6,770,029 B2 | 8/2004 | Iliff |
| 6,801,899 B2 | 10/2004 | Lauffer |
| 6,807,532 B1 | 10/2004 | Kolls |
| 6,813,346 B2 | 11/2004 | Gruchala et al. |
| 6,836,225 B2 | 12/2004 | Lee et al. |
| 6,847,992 B1 | 1/2005 | Haitsuka et al. |
| 6,849,045 B2 | 2/2005 | Iliff |
| 6,850,965 B2 | 2/2005 | Allen |
| 6,856,809 B2 | 2/2005 | Fostick |
| 6,859,833 B2 | 2/2005 | Kirsch et al. |
| 6,910,035 B2 | 6/2005 | Hoekman et al. |
| 6,937,699 B1 | 8/2005 | Schuster et al. |
| 6,968,174 B1 | 11/2005 | Trandal et al. |
| 6,978,270 B1 | 12/2005 | Carty et al. |
| 6,993,326 B2 | 1/2006 | Link, II et al. |
| 7,028,012 B2 | 4/2006 | St. Vrain |
| 7,035,381 B2 | 4/2006 | D'Ascenzo et al. |
| 7,035,468 B2 | 4/2006 | Yogeshwar et al. |
| 7,035,634 B2 | 4/2006 | Mead et al. |
| 7,062,453 B1 * | 6/2006 | Clarke .................. 705/26.3 |
| 7,076,037 B1 | 7/2006 | Gonen et al. |
| 7,085,745 B2 | 8/2006 | Klug |
| 7,092,901 B2 | 8/2006 | Davis et al. |
| 7,099,306 B2 | 8/2006 | Goodman et al. |
| 7,103,010 B2 | 9/2006 | Melideo |
| 7,120,235 B2 | 10/2006 | Altberg et al. |
| 7,146,429 B2 | 12/2006 | Michel |
| 7,181,415 B2 | 2/2007 | Blaser et al. |
| 7,187,761 B2 | 3/2007 | Bookstaff |
| 7,200,413 B2 | 4/2007 | Montemer |
| 7,212,615 B2 | 5/2007 | Wolmuth |
| 7,224,781 B2 | 5/2007 | Jacob et al. |
| 7,227,936 B2 | 6/2007 | Bookstaff |
| 7,231,405 B2 | 6/2007 | Xia |
| 7,240,110 B2 | 7/2007 | Haitsuka et al. |
| 7,240,290 B2 | 7/2007 | Melideo |
| 7,249,045 B2 | 7/2007 | Lauffer |
| 7,297,108 B2 | 11/2007 | Iliff |
| 7,297,111 B2 | 11/2007 | Iliff |
| 7,300,402 B2 | 11/2007 | Iliff |
| 7,306,560 B2 | 12/2007 | Iliff |
| 7,363,254 B2 | 4/2008 | Skinner |
| 7,366,683 B2 | 4/2008 | Altberg et al. |
| 7,373,599 B2 | 5/2008 | McElfresh et al. |
| 7,380,139 B2 | 5/2008 | Tagawa et al. |
| 7,401,053 B2 | 7/2008 | Kamimura et al. |
| 7,433,459 B2 | 10/2008 | Reding et al. |
| 7,434,175 B2 | 10/2008 | Melideo |
| 7,475,149 B2 | 1/2009 | Jacob et al. |
| 7,698,183 B2 | 4/2010 | Faber et al. |
| 7,886,067 B2 * | 2/2011 | Krassner et al. ............. 709/231 |
| 7,979,308 B2 | 7/2011 | Ho et al. |
| 8,027,898 B2 | 9/2011 | Faber et al. |
| 8,140,392 B2 | 3/2012 | Altberg et al. |
| 8,180,676 B2 | 5/2012 | Altberg et al. |
| 8,200,534 B2 | 6/2012 | Wong et al. |
| 8,209,225 B2 | 6/2012 | Altberg et al. |
| 8,484,084 B2 | 7/2013 | Altberg et al. |
| 8,521,596 B2 | 8/2013 | Altberg et al. |
| 8,538,768 B2 | 9/2013 | Agarwal et al. |
| 8,599,832 B2 | 12/2013 | Altberg et al. |
| 8,681,952 B2 | 3/2014 | Agarwal et al. |
| 8,700,461 B2 | 4/2014 | Wong et al. |
| 8,761,154 B2 | 6/2014 | Altberg et al. |
| 8,837,698 B2 | 9/2014 | Altberg et al. |
| 8,856,014 B2 | 10/2014 | Agarwal et al. |
| 8,934,614 B2 | 1/2015 | Altberg et al. |
| 9,094,486 B2 | 7/2015 | Altberg et al. |
| 9,094,487 B2 | 7/2015 | Altberg et al. |
| 9,105,032 B2 | 8/2015 | Altberg et al. |
| 9,118,778 B2 | 8/2015 | Altberg et al. |
| 9,202,217 B2 | 12/2015 | Altberg et al. |
| 9,305,304 B2 | 4/2016 | Faber et al. |
| 9,317,855 B2 | 4/2016 | Altberg et al. |
| 2001/0012913 A1 | 8/2001 | Iliff |
| 2001/0027481 A1 | 10/2001 | Whyel |
| 2001/0032247 A1 | 10/2001 | Kanaya |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0004735 A1 | 1/2002 | Gross |
| 2002/0010608 A1 | 1/2002 | Faber et al. |
| 2002/0010616 A1 | 1/2002 | Itzhaki |
| 2002/0026457 A1 | 2/2002 | Jensen |
| 2002/0029241 A1 | 3/2002 | Yokono et al. |
| 2002/0038233 A1 | 3/2002 | Shubov et al. |
| 2002/0057776 A1 | 5/2002 | Dyer |
| 2002/0065959 A1 | 5/2002 | Kim et al. |
| 2002/0077891 A1 | 6/2002 | Castle et al. |
| 2002/0077930 A1 * | 6/2002 | Trubey et al. .................. 705/26 |
| 2002/0087565 A1 | 7/2002 | Hoekman et al. |
| 2002/0087704 A1 | 7/2002 | Chesnais et al. |
| 2002/0095331 A1 | 7/2002 | Osman et al. |
| 2002/0107697 A1 | 8/2002 | Jensen |
| 2002/0120554 A1 | 8/2002 | Vega |
| 2002/0122547 A1 | 9/2002 | Hinchey et al. |
| 2002/0133402 A1 | 9/2002 | Faber et al. |
| 2002/0133571 A1 | 9/2002 | Jacob et al. |
| 2002/0136377 A1 | 9/2002 | Stewart et al. |
| 2002/0160766 A1 | 10/2002 | Portman et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0026397 A1 | 2/2003 | McCroskey |
| 2003/0043981 A1 | 3/2003 | Lurie et al. |
| 2003/0046161 A1 | 3/2003 | Kamangar et al. |

(56) References Cited

U.S. PATENT DOCUMENTS

| | | |
|---|---|---|
| 2003/0050837 A1 | 3/2003 | Kim |
| 2003/0083042 A1 | 5/2003 | Abuhamdeh |
| 2003/0105824 A1 | 6/2003 | Brechner et al. |
| 2003/0135460 A1 | 7/2003 | Talegon |
| 2003/0195787 A1 | 10/2003 | Brunk et al. |
| 2003/0212600 A1 | 11/2003 | Hood et al. |
| 2003/0220837 A1 | 11/2003 | Asayama |
| 2003/0220866 A1 | 11/2003 | Pisaris-Henderson |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0010518 A1 | 1/2004 | Montemer |
| 2004/0039640 A1 | 2/2004 | Koppelman et al. |
| 2004/0044571 A1* | 3/2004 | Bronnimann et al. ......... 705/14 |
| 2004/0076403 A1 | 4/2004 | Mankovitz |
| 2004/0083133 A1 | 4/2004 | Nicholas et al. |
| 2004/0096110 A1 | 5/2004 | Yogeshwar et al. |
| 2004/0103024 A1 | 5/2004 | Patel et al. |
| 2004/0107137 A1 | 6/2004 | Skinner |
| 2004/0162757 A1 | 8/2004 | Pisaris-Henderson et al. |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0199422 A1 | 10/2004 | Napier et al. |
| 2004/0204997 A1 | 10/2004 | Blaser et al. |
| 2004/0225562 A1 | 11/2004 | Turner |
| 2004/0234049 A1 | 11/2004 | Melideo |
| 2004/0234064 A1 | 11/2004 | Melideo |
| 2004/0235524 A1 | 11/2004 | Abuhamdeh |
| 2004/0236441 A1 | 11/2004 | Melideo |
| 2004/0247092 A1 | 12/2004 | Timmins et al. |
| 2004/0249649 A1 | 12/2004 | Stratton et al. |
| 2004/0249709 A1 | 12/2004 | Donovan et al. |
| 2004/0249778 A1 | 12/2004 | Iliff |
| 2004/0254859 A1 | 12/2004 | Aslanian |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0018829 A1 | 1/2005 | Baker |
| 2005/0021744 A1 | 1/2005 | Haitsuka et al. |
| 2005/0033641 A1 | 2/2005 | Jha et al. |
| 2005/0041647 A1 | 2/2005 | Stinnie |
| 2005/0048961 A1 | 3/2005 | Ribaudo et al. |
| 2005/0065811 A1 | 3/2005 | Chu et al. |
| 2005/0074100 A1 | 4/2005 | Lederman |
| 2005/0074102 A1 | 4/2005 | Altberg et al. |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0096980 A1 | 5/2005 | Koningstein |
| 2005/0097204 A1 | 5/2005 | Horowitz et al. |
| 2005/0100153 A1 | 5/2005 | Pines et al. |
| 2005/0105881 A1 | 5/2005 | Mankovitz |
| 2005/0114210 A1 | 5/2005 | Faber et al. |
| 2005/0119957 A1 | 6/2005 | Faber et al. |
| 2005/0125416 A1 | 6/2005 | Kirsch et al. |
| 2005/0135387 A1 | 6/2005 | Rychener et al. |
| 2005/0149396 A1 | 7/2005 | Horowitz et al. |
| 2005/0165666 A1 | 7/2005 | Wong et al. |
| 2005/0203796 A1 | 9/2005 | Anand et al. |
| 2005/0203799 A1 | 9/2005 | Faber et al. |
| 2005/0207432 A1 | 9/2005 | Velez-Rivera et al. |
| 2005/0209874 A1 | 9/2005 | Rossini |
| 2005/0216341 A1 | 9/2005 | Agarwal et al. |
| 2005/0216345 A1 | 9/2005 | Altberg et al. |
| 2005/0220289 A1 | 10/2005 | Reding et al. |
| 2005/0222908 A1 | 10/2005 | Altberg et al. |
| 2005/0240432 A1 | 10/2005 | Jensen |
| 2005/0245241 A1 | 11/2005 | Durand et al. |
| 2005/0251445 A1 | 11/2005 | Wong et al. |
| 2005/0261964 A1 | 11/2005 | Fang |
| 2005/0286688 A1 | 12/2005 | Scherer |
| 2005/0289015 A1 | 12/2005 | Hunter et al. |
| 2005/0289026 A1 | 12/2005 | Dunn et al. |
| 2006/0003735 A1 | 1/2006 | Trandal et al. |
| 2006/0004627 A1 | 1/2006 | Baluja |
| 2006/0026061 A1 | 2/2006 | Collins |
| 2006/0069610 A1 | 3/2006 | Rossini |
| 2006/0095281 A1* | 5/2006 | Chickering et al. ............ 705/1 |
| 2006/0095343 A1 | 5/2006 | Clarke et al. |
| 2006/0099936 A1 | 5/2006 | Link, II et al. |
| 2006/0106711 A1 | 5/2006 | Melideo |
| 2006/0136310 A1 | 6/2006 | Gonen et al. |
| 2006/0149624 A1* | 7/2006 | Baluja et al. .................. 705/14 |
| 2006/0159063 A1 | 7/2006 | Kumar |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0182250 A1 | 8/2006 | Melideo |
| 2006/0184417 A1 | 8/2006 | Van der Linden et al. |
| 2006/0200380 A1 | 9/2006 | Ho et al. |
| 2006/0247999 A1 | 11/2006 | Gonen et al. |
| 2006/0259365 A1 | 11/2006 | Agarwal et al. |
| 2006/0277108 A1 | 12/2006 | Altberg et al. |
| 2006/0277181 A1 | 12/2006 | Temple et al. |
| 2007/0011240 A1 | 1/2007 | Altberg et al. |
| 2007/0022011 A1 | 1/2007 | Altberg et al. |
| 2007/0038507 A1 | 2/2007 | Kumar |
| 2007/0067219 A1 | 3/2007 | Altberg et al. |
| 2007/0078717 A1 | 4/2007 | Ho et al. |
| 2007/0081662 A1 | 4/2007 | Altberg et al. |
| 2007/0083408 A1 | 4/2007 | Altberg et al. |
| 2007/0100956 A1 | 5/2007 | Kumar |
| 2007/0116217 A1 | 5/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0127650 A1 | 6/2007 | Altberg et al. |
| 2007/0129054 A1 | 6/2007 | Andronikov et al. |
| 2007/0130014 A1 | 6/2007 | Altberg et al. |
| 2007/0140451 A1 | 6/2007 | Altberg et al. |
| 2007/0143182 A1 | 6/2007 | Faber et al. |
| 2007/0162296 A1 | 7/2007 | Altberg et al. |
| 2007/0174124 A1 | 7/2007 | Zagofsky et al. |
| 2007/0192300 A1 | 8/2007 | Reuther et al. |
| 2007/0233681 A1 | 10/2007 | Ronen et al. |
| 2007/0255622 A1 | 11/2007 | Swix et al. |
| 2007/0269038 A1 | 11/2007 | Gonen et al. |
| 2008/0301190 A1 | 12/2008 | Lockhart et al. |
| 2008/0313277 A1 | 12/2008 | Altberg et al. |
| 2009/0067599 A1 | 3/2009 | Agarwal et al. |
| 2009/0157593 A1 | 6/2009 | Hayashi et al. |
| 2009/0177647 A1 | 7/2009 | Oliver et al. |
| 2010/0017266 A1 | 1/2010 | Faber et al. |
| 2013/0262240 A1 | 10/2013 | Altberg et al. |
| 2013/0325635 A1 | 12/2013 | Altberg et al. |
| 2014/0207588 A1 | 7/2014 | Wong et al. |
| 2016/0012476 A1 | 1/2016 | Altberg et al. |
| 2016/0042406 A1 | 2/2016 | Altberg et al. |
| 2016/0050187 A1 | 2/2016 | Altberg et al. |
| 2016/0196583 A1 | 7/2016 | Altberg et al. |

FOREIGN PATENT DOCUMENTS

| | | |
|---|---|---|
| CA | 2475965 A1 | 4/2005 |
| CA | 2504623 A1 | 9/2005 |
| CA | 2506360 A1 | 10/2005 |
| CA | 2504629 A1 | 11/2005 |
| CA | 2566312 A1 | 11/2005 |
| CA | 2599184 A1 | 8/2006 |
| CA | 2599371 A1 | 8/2006 |
| CA | 2624389 A1 | 4/2007 |
| CA | 2685678 A1 | 11/2008 |
| CA | 2690837 A1 | 1/2010 |
| CN | 1836438 A | 9/2006 |
| CN | 1839405 A | 9/2006 |
| CN | 1998018 B | 7/2007 |

(56) References Cited

FOREIGN PATENT DOCUMENTS

| | | |
|---|---|---|
| CN | 101124557 A | 2/2008 |
| CN | 101258474 A | 9/2008 |
| EP | 1489529 A1 | 12/2004 |
| EP | 1522944 A1 | 4/2005 |
| EP | 1636751 A2 | 3/2006 |
| EP | 1646979 A2 | 4/2006 |
| EP | 1665156 A2 | 6/2006 |
| EP | 1754187 A2 | 2/2007 |
| EP | 1759344 A2 | 3/2007 |
| EP | 1851679 A2 | 11/2007 |
| EP | 1880340 A2 | 1/2008 |
| EP | 1938566 A2 | 7/2008 |
| EP | 1977385 A2 | 10/2008 |
| EP | 1977590 A2 | 10/2008 |
| EP | 2153399 A2 | 2/2010 |
| EP | 2201521 A2 | 6/2010 |
| GB | 2329046 | 3/1999 |
| GB | 2407229 A | 4/2006 |
| GB | 2424973 A | 10/2006 |
| GB | 2425375 A | 10/2006 |
| GB | 2430767 A | 4/2007 |
| JP | 9233441 | 9/1997 |
| JP | 9319812 | 12/1997 |
| JP | 2005115945 A | 4/2005 |
| WO | 9705733 | 2/1997 |
| WO | 9802835 | 1/1998 |
| WO | 9804061 | 1/1998 |
| WO | 9813765 | 4/1998 |
| WO | 9838558 | 9/1998 |
| WO | 9847295 | 10/1998 |
| WO | 9955066 | 10/1999 |
| WO | 0057326 | 9/2000 |
| WO | 0127825 | 4/2001 |
| WO | 0128141 | 4/2001 |
| WO | 0244870 | 6/2002 |
| WO | 03030507 | 4/2003 |
| WO | 2005040962 | 5/2005 |
| WO | 2005086980 | 9/2005 |
| WO | 2005101269 | 10/2005 |
| WO | 2005109287 | 11/2005 |
| WO | 2005109288 | 11/2005 |
| WO | 2005111887 | 11/2005 |
| WO | 2005111893 | 11/2005 |
| WO | WO 2006091966 A2 | 8/2006 |
| WO | WO 2006091970 A2 | 8/2006 |
| WO | 2007028173 | 3/2007 |
| WO | 2007038618 | 4/2007 |
| WO | WO 2007086991 A2 | 8/2007 |
| WO | WO 2007086992 A2 | 8/2007 |
| WO | WO 2008005779 A2 | 1/2008 |
| WO | WO 2008033953 A2 | 3/2008 |
| WO | WO 2008040010 A2 | 4/2008 |
| WO | WO 2008040013 A2 | 4/2008 |
| WO | 2008052083 | 5/2008 |
| WO | WO 2008058295 A1 | 5/2008 |
| WO | WO 2008070327 A2 | 6/2008 |
| WO | WO 2008134207 A1 | 11/2008 |
| WO | WO 2010005420 A2 | 1/2010 |

OTHER PUBLICATIONS

"AtOnce Talks Up E-mail Marketing Campaigns with ITXC Push to Talk Service," Business Wire, Feb. 26, 2001.
"ITXC Corp and Doubleclick Energize Banner Ads with Web Telephony; Companies Voice-Enable Banner Advertisements Using ITXC Push to Talk Service," Business Wire, Dec. 12, 2000.
Ads-Click, "ADS-click Adds Skype-Based Pay-Per-Call Advertising Capabilities to Its Private-Labeled Solution, which will be Unveiled at ad:tech New York," Market Wire, Oct. 10, 2005.
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Hansell, Saul, "Google's Toughest Search is for a Business Model," New York Times, Late Edition, Final ED, col. 02, p. 1, Apr. 8, 2002.
Ingenio, Inc., "FindWhat.com Enters Agreement with Ingenio to Offer Pay Per Call Advertising Platform," press release available at http://www.ingenio.com, Apr. 7, 2004.
International Application No. PCT/US06/07023, Written Opinion and International Search Report, Aug. 7, 2007.
International Application No. PCT/US06/07047, Written Opinion and International Search Report, Aug. 9, 2007.
International Application No. PCT/US07/82439, Written Opinion and International Search Report, Feb. 21, 2008.
Jambo, "Welcome to Jambo—The Leader in Pay-Per-Call Solutions," company information retrieved from http://www.jambo.com, available at least by Oct. 17, 2005.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
Mullins, Robert, "Yahoo Aims for Middle with New Web Advertising Strategy," Silicon Valley/San Jose Business Journal, vol. 19, No. 30, p. 21, Nov. 23, 2001.
Transaction History for U.S. Appl. No. 11/077,516, filed Mar. 9, 2005, entitled "System and Method to Merge Pay-for-Performance Advertising Models."
Transaction History for U.S. Appl. No. 11/559,860, filed Nov. 14, 2006, entitled "Methods and Apparatuses for Prioritizing Advertisements for Presentation."
Transaction History for U.S. Appl. No. 11/688,245, filed Mar. 19, 2007, entitled "Methods and Apparatuses for Prioritizing Featured Listings."
Transaction History for U.S. Appl. No. 11/863,208, filed Sep. 27, 2007, entitled "Systems and Methods to Provide Communication References from Different Sources to Connect People for Real Time Communications."
Transaction History for U.S. Appl. No. 12/534,770, filed Aug. 3, 2009, entitled "Methods and Apparatuses for Prioritizing a Listing of Information Providers."
"Applying Technology News," Accounting Technology, p. 14, Feb./Mar. 1997.
"Connecting to On-Line Car Shoppers: Auto Sellers Use Netcall Internet Call-Button Technology to Turn 'Clicks' into Interactive Sales," Business Wire, p. 4089, Jul. 19, 1999.
"Keen.com raises $60 Million from Prestigious Investors and Strategic Partners Just 60 Days After Launch of Its Live Answer Community," Business Wire, Jan. 11, 2000.
"NetCall Internet Call Buttons Enhance E-Commerce Customer Service and Sales," PR Newswire, p. 7431, Aug. 9, 1999.
"Sell and Buy Advice Online," The Ottawa Citizen, p. D7, Nov. 29, 1999.
"TriNet's 'Help Me, I'm Stuck' Internet Voice Button Services Pushes Web Pages to Online Users," Business Wire, Mar. 25, 1998.
Addeo, E.J. et al., "An Experimental Multi-Media Bridging System," Frontiers in Computer Communications Technology, Computer Communications Review, vol. 17, No. 5, pp. 236-242, Aug. 11-13, 1987.
Allexperts.com, company information retrieved from http://www.allexperts.com, available at least by Apr. 9, 2000.
Angelo, Simon, "SurfBrains.com: Brains Online Save Time & Money," M2 Presswire, Jul. 11, 2000.
Answers.com, company information retrieved from http://www.answers.com, available at least by Aug. 8, 2000.
Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.
About Intellectexchange.com, Inc., company information retrieved from http://www.intellectexchange.com/About.asp, pp. 1-12, available at least by Aug. 8, 2000.

(56) References Cited

OTHER PUBLICATIONS

Bazini, Liz, "UpSnap Selects LookSmart to Sell Premium Listings on FREE 411 Service for Text-Enabled Cell Phones," Nov. 4, 2004.
Becker, Ralph, "ISDN Tutorial: Interfaces," retrieved from http://www.ralphb.net/ISDN/ifaces.html, available at least by Apr. 21, 2000.
Becker, Ralph, "ISDN Tutorial: Definitions," retrieved from http://www.ralphb.net/ISDN/defs.html, available at least by Apr. 21, 2000.
Broad, Doug et al., "Lucent Technology and Netscape Team to Deliver Lucent Ecommerce Solutions," Business Wire, Sep. 23, 1998.
Chimiak, William H. et al., "Multimedia Collaborative Remote Consultation Tools via Gigabit WAN in Teleradiology," IEEE 13th Annual International Phoenix Conference on Computers and Communications, pp. 417-423, Apr. 12-15, 1994.
Clark, Don, "Keen.com Plans Web Service Allowing Customers to Hold Private Phone Chats," Wall Street Journal, Nov. 8, 1999.
Collett, Stacey et al., "Why Online Browsers Don't Become Buyers," Computerworld, vol. 33, No. 48, p. 14, Nov. 29, 1999.
Dalton, Gregory, "Rent-An-Expert on the Web," Information Week, p. 75, Sep. 6, 1999.
Davey, Tom, "Wheeling and Dealing Online," PC Week, vol. 13, No. 45, pp. 1, 129, Nov. 11, 1996.
De Lasser, Eleena, "When Business Plan and Real World Clash," Wall Street Journal, p. B1, Jun. 1999.
Drescher, Bob et al., "Aspect Telecommunications Integrates the Web into the Call Center to Deliver New Level of Customer Service," Business Wire, Aug. 5, 1996.
Dyson, Esther, "Information, Bid and Asked," Forbes, p. 92, Aug. 20, 1990.
Ek, Brian, "Walker Digital Issued Landmark U.S. Pat. No. 5,862,223 for Global Internet Marketplace for Experts", Business Wire, Jan. 26, 1999.
Ellis, James E., "For Telesphere's Clients, Dial 1-900 TUF LUCK," Business Week, pp. 88-89, Sep. 9, 1991.
Exp.com, Inc., company information retrieved from http://www.exp.com, available at least by Sep. 20, 2000.
Expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
Green Digital Media, Inc., Big Green Blog: Jan. 2005 Archives, Jan. 28-31, 2005.
Greenblatt, Ellen, "Have You Ever Wondered. . . .," Datamation, p. 126, Oct. 1997.
Griffiths, J.W.R. et al., "Multimedia Communication in a Medical Environment," Singapore International Conference on Networks, pp. 166-171, Sep. 5, 1991.
Hase, Masahiko et al., "Advanced Videophone System Using Synchronized Video Filing Equipment," NTT Review, vol. 3, No. 4, pp. 29-36, Jul. 1991.
Healey, John, "From A-Z: You Can Sell Advice Online," San Jose Mercury News, retrieved from http://www.mercurycenter.com on Oct. 24, 2001.
Herman, Edith, "U.S. Courts to Launch First Federal 900 Service," Federal Computer Week, pp. 8, 10, Sep. 28, 1992.
Herzberg, Amir et al., "MiniPay: Charging Per Click on the Web," Computer Networks and ISDN Systems, vol. 29, pp. 939-951, Sep. 1997.
Hodgson, Cynthia, "Online Expert Databases & Services," Econtent, pp. 48-53, Dec. 1999.
Information Markets Corp., company information retrieved from http://www.infomarkets.com, available at least by Aug. 8, 2000.
Ingenio, Inc., "Keen: Your Personal Advisor," retrieved from http://www.keen.com, available at least by Feb. 4, 2006.
Ingenio, Inc., Press Archives for 2004, retrieved from http://www.ingenio.com on Feb. 21, 2006.
International Application No. PCT/US05/12061, Written Opinion and International Search Report, Nov. 17, 2006.
International Application No. PCT/US01/48284, International Search Report, May 13, 2002.
Jarvie, Barbara, "Company Devoted to Hot-Line Support," Computer Reseller News, p. 48, Oct. 21, 1991.
Kabeya, Kiyoshi et al., "A New Teleconsultation Terminal System Using ISDN," NTT Review, vol. 3, No. 4, pp. 37-43, Jul. 1991.
Kanellos, Michael, "Web Watch: Do You Want to Know the Meaning of Life?," Computer Reseller News, pp. 72-74, Mar. 3, 1997.
Keen.com, "Keen.com Launches First Live Answer Community, Connects People with Information to Share Over Their Standard Telephone," company press release, Nov. 8, 1999.
Keen.com, company information retrieved from http://www.keen.com, available at least by 1999.
Kuehn, Richard A., "The Voice of Technology," Credit World, pp. 20-23, Jul. 1994.
Littleton, Linda, "HDD: A Helpdesk Database," Proceedings of the ACM SIGUCCS User Services Conference XXII, pp. 205-210, Oct. 16-19, 1994.
Ludwig, L.F. et al., "Laboratory for Emulation and Study of Integrated and Coordinated Media Communication," Conference on Office Information Systems, pp. 283-291, Mar. 23-25, 1988.
Melideo, John, U.S. Appl. No. 60/471,535 entitled "HyperDial," filed May 19, 2003.
Menn, Joseph, "An Expert? There's Now a Home for You on the Internet," Los Angeles Times, retrieved from http://www.denverpost.com on Oct. 24, 2001.
Mercalli, Franco et al., "The ESSAI Teleshopping System: An Example of a Broadband Multimedia Application," IEEE Global Telecommunications Conference, pp. 572-576, Nov. 28, 1994.
Moore, Michael et al., "USA Global Link Brings Interactively to Internet Shopping," Business Wire, Oct. 7, 1998.
Ott, Chris, "Making Good on the Information Economy," Denver Business Journal, vol. 51, No. 17, p. 27A, Dec. 17, 1999.
Pelline, Jeff, "Net Firm to Connect Users by Phone," CNET News.com, Nov. 8, 1999.
Qcircuit.com, company information retrieved from http://www.qcircuit.com, available at least by Aug. 8, 2000.
Reding, Craig et al., U.S. Appl. No. 09/596,466 entitled "Methods and Apparatus for Providing Telephone Support for Internet Sales," filed Jun. 19, 2000.
Robinson, John, "Attachmate Ready to Answer 'Net Questions," Network World, p. 37, Apr. 8, 1996.
Rogers, Michael et al., "Experts Abound at New Web Sites," Library Journal, pp. 22-24, Mar. 1, 2000.
Sairamesh, Jakka et al., "NetBazaar: Networked Electronic Markets for Trading Computation and Information Services," Second European Conference on Research and Advanced Technology for Digital Libraries, pp. 839-856, Sep. 21, 1998.
Tehrani, Rich, "e-Rip Van Winkle and the 60-second Nap," Call Center Solutions, vol. 18, No. 2, pp. 16-18, Aug. 1999.
Telecommunications Buyers Guide and Directory, Editor & Publisher, pp. 29TC-38TC, Feb. 12, 1994.
U.S. District Court, Southern District of New York, Keen.com, Inc. v. InfoRocket.com, Inc., Preliminary Injunction Hearing, pp. 286-289, Jan. 8, 2002.
U.S. District Court, Southern District of New York, Keen.com, Inc. v. InfoRocket.com, Inc.: Complaint for Patent Infringement, Trade Dress Infringement and Unfair Competition; Demand for Jury Trial, Aug. 31, 2001.
University of Texas—Austin, information on the Electronic Emissary Project retrieved at www.tapr.org/emissary, available at least by Apr. 9, 2000.
Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.
Wasik, Joann M., "Information for Sale: Commercial Digital Reference and AskA Services," Virtual Reference Desk, http://www.vrd.org/AskA/commAskA.html, Sep. 20, 1999.
Wieland, Heidi et al., "Expertcity.com Launches Premier Online Marketplace for Expert Services," PR Newswire, Aug. 30, 1999.

(56) References Cited

OTHER PUBLICATIONS

Wood, Christina, "Hidden Cost of Tech Support," PC World, pp. 143-152, 156, May 1995.
International Searching Authority, International Search Report, PCT/US06/07023, Aug. 7, 2007, 1 page.
"Expertcity.com Launches Premier Online Marketplace for Expert Services," PR Newswire (Aug. 1999).
"Google's Toughest Search Is for a Business Model," Saul Hansell, New York Times, Late Edition—Final ED, Col. 02, p. 1, Monday, Apr. 8, 2002.
"Yahoo aims for middle with new Web advertising strategy," Mullins, Robert, Silicon Valley/San Jose Business Journal v19n30, p. 21, Nov. 23, 2001.
Big Green Blog: Jan. 2005 Archives, Feb. 21, 2006.
CIPO Office Action for Application No. 2,599,184, Aug. 27, 2015, 5 pages, Canada.
CIPO Office Action for Application No. 2,599,184, Feb. 28, 2012, 5 pages, Canada.
European Patent Office, Extended European Search Report, 06736362.2, Jun. 17, 2011, 4 pages, Germany.
U.S. Appl. No. 09/596,466, "Methods and apparatus for providing telephone support for internet sales", Unpublished (filed Jun. 19, 2000), (Craig L. Reding, Inventor) (Bell Atlantic Network Services, Inc., assignee).
U.S. Appl. No. 60/198,642, "Systems and methods for connecting customers to merchants over a voice communication network," Unpublished (filed Apr. 20, 2000), (Peter Rothschild, Inventor).
U.S. Appl. No. 60/471,535, "HyperDial", Unpublished (filed May 19, 2003), (John Melideo, Inventor).
U.S. Appl. No. 60/552,124, "Method and apparatus to provide pay-per-call advertising and billing," Unpublished (filed Mar. 10, 2004), (Scott Faber, Inventor).
U.S. Appl. No. 60/560,926, "Method and apparatus to track demand partners in a pay-per-call performance based advertising system," Unpublished (filed Apr. 9, 2004), (Scott Faber, Inventor).
U.S. Appl. No. 60/568,156, "Method and apparatus to allocate telephone numbers to demand partners in a pay-per-call performance based advertising system," Unpublished (filed May 4, 2004), (Scott Faber, Inventor).
USPTO Notice of Allowance for U.S. Appl. No. 11/072,147, filed Mar. 3, 2011, 12 pages, USA.
USPTO Office Action for U.S. Appl. No. 11/072,147, filed Jul. 26, 2010, 24 pages, USA.
USPTO Office Action for U.S. Appl. No. 11/072,147, filed Mar. 16, 2010, 24 pages, USA.
USPTO Office Action for U.S. Appl. No. 11/072,147, filed Mar. 5, 2009, 49 pages, USA.
USPTO Office Action for U.S. Appl. No. 11/072,147, filed Sep. 11, 2009, 18 pages, USA.

\* cited by examiner

400

Tools Home > Reports Home > My Advertisers          Sign Out

Advertiser Group: [ALL ▽] ⟵ 401
Call Results: [ALL ▽] ⟵ 403
Display As: [Web Page ▽] ⟵ 405
Show Data For: ○ [Yesterday ▽] ⟵ 407
● From: [09/01/2004] To: [01/06/2005]
↖ 409

[Create Report] ⟵ 411

All Advertisers
Date Range: 09/01/2004 through 01/06/2005. Call Result: All Calls.

| Advertiser | Calls | Call Charges | | Affiliate Earnings | |
|---|---|---|---|---|---|
| | | Average | Total | Average | Total |
| Advertiser A | 118 | $5.00 | $580.00 | $3.00 | $348.00 |
| Advertiser B | 29 | $3.50 | $98.00 | $2.49 | $72.21 |
| Advertiser C | 28 | $4.25 | $119.00 | $3.09 | $86.52 |

METHODS AND APPARATUSES FOR SORTING LISTS FOR PRESENTATION

CROSS-REFERENCE TO RELATED APPLICATIONS

The present application is a continuation application of U.S. patent application Ser. No. 11/072,147, filed Mar. 3, 2005 and entitled "Methods and Apparatuses for Sorting Lists for Presentation," now U.S. Pat. No. 7,979,308, which claims priority from Provisional U.S. Patent Application Ser. No. 60/656,637, filed Feb. 25, 2005 and entitled "System and Method to Merge Pay-For-Performance Advertising Models," the disclosures of which applications are incorporated herein by reference in their entirety.

TECHNOLOGY FIELD

At least some embodiments of the present invention relate to sorting lists, such as search result lists for advertisement, publicity, etc.

BACKGROUND

The Internet is becoming an advertisement media to reach globally populated web users. Advertisements can be included in a web page that is frequently visited by web users or that returns the result of a user requested search.

Typically, the advertisements included in the web pages contain only a limited amount of information (e.g., a small paragraph, an icon, etc.). The advertisements contain links to web sites that provide further detailed information.

In certain arrangements, the advertisers pay the advertisements based on the number of visits directed to the web sites through the links in the advertisements. Thus, the advertisers pay for the performance of the advertisements.

Performance based advertising generally refers to a type of advertising in which an advertiser pays only for a measurable event that is a direct result of an advertisement being viewed by a consumer.

Paid inclusion advertising is a form of performance-based search advertising. With paid inclusion advertising, an advertisement is included within a result page of a search. Typically, each selection (e.g., click) of the advertisement from the result page is the measurable event for which the advertiser pays. In other words, payment by the advertiser is typically on a per click basis.

Paid placement advertising is another form of performance-based advertising, similar to paid inclusion advertising. Typically, the payment for paid placement advertising is also on a per click basis. With paid placement advertising an advertiser wants the opportunity of having a particular advertisement placed at a prominent spot, e.g., at the top of a search engine result page, thereby to increase the odds of the advertisement being viewed.

In paid inclusion advertising or paid placement advertising, the advertiser may adjust the price the advertiser is willing to pay for each selection (e.g., click) to balance the cost for the advertisement and the odds of obtaining the desired prominent spot or a high position in a list of advertisements.

For example, one advertising site may create a single queue of advertisements, which is sorted based on the per-click price specified by the advertisers. Adjusting the prices allows the advertisers to change their own placement and the advertisement cost.

Currently, a search engine web site can present a list of advertisers/advertisements in response to a user request for certain information. The list of advertisers/advertisements may be sorted or selected for presentation partially according to the relevancy of the advertisements to the information requested by the user. The advertisers/advertisements may be sorted or selected for presentation partially according to the price the advertisers specified for payment of the performance of the advertisements.

In an existing advertising network, a web site may sort the pool of advertisements into two separate queues. One queue is for the direct advertisers of the web site; and the other is for the indirect advertisers of the web site. The entire queue of the direct advertisers is sorted ahead of the indirect advertisers so that the direct advertisers are better served than the indirect advertisers on the web site.

SUMMARY OF THE DESCRIPTION

Methods and apparatuses for sorting seller listings or advertisements of a seller network are presented. In one embodiment, a method includes: determining an indicator of potential revenue for a first party from price information of a list of entities, wherein revenue generated according to the price information of at least some of the list of entities is to be split among a plurality of parties; and, sorting the list of entities into a first list based at least partially on the indicator of potential revenue.

The present invention includes methods and apparatuses that perform these methods, including data processing systems that perform these methods and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4 illustrates a user interface to display affiliate earnings of a supplier of a seller network according to one embodiment of the present invention.

DETAILED DESCRIPTION

Figure 1:
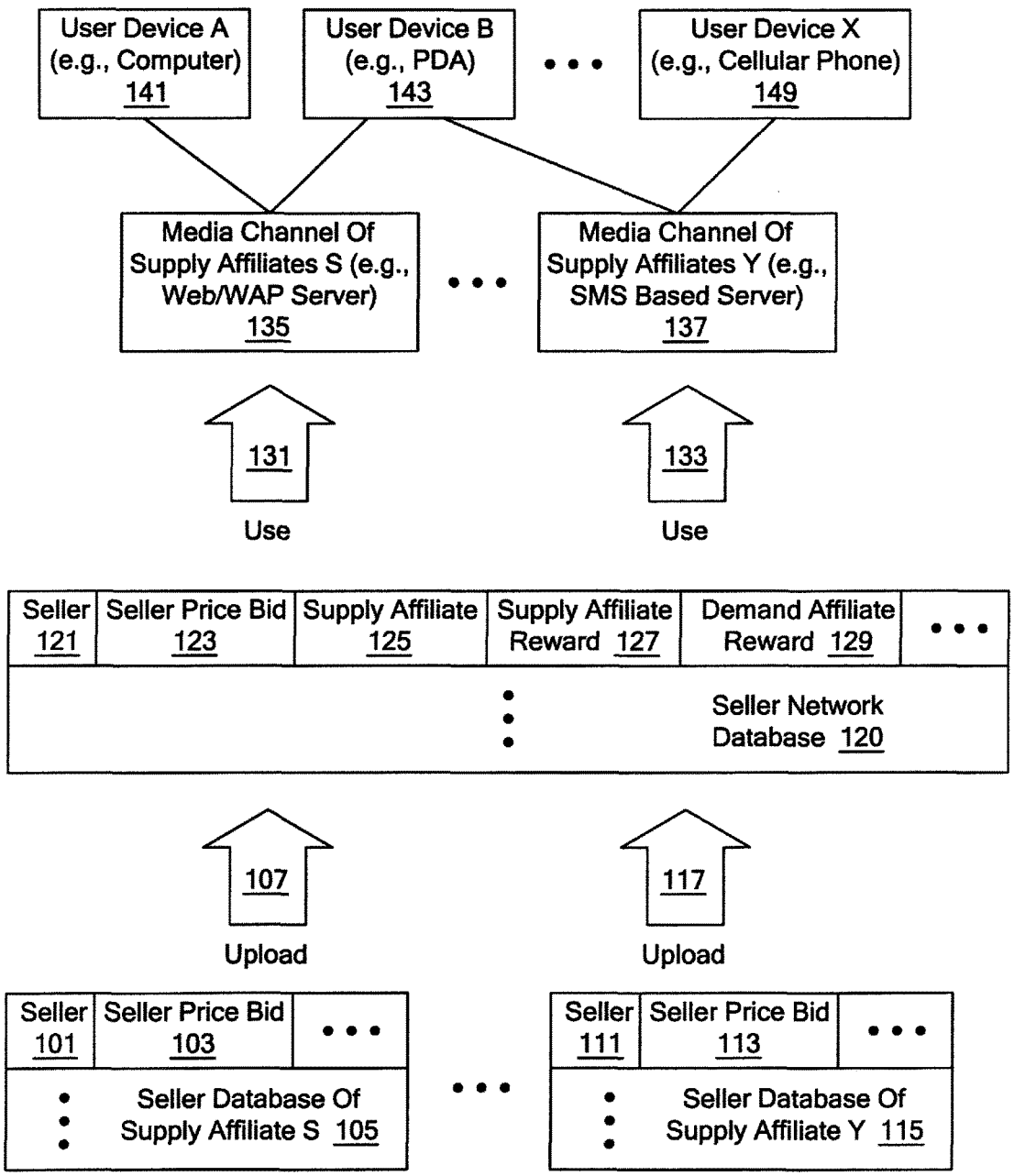
FIG. 1 illustrates a seller network according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

One embodiment of the present invention provides a system of a seller network. The seller network includes a number of supply affiliates who provide or supply sellers for the seller network. The seller network also includes a number of demand affiliates who drive the demand of the customers to the seller network. Some affiliates can be both supply affiliates and demand affiliates.

Demand affiliates can be used to drive traffic to a seller or a network of sellers, especially in the Internet world. For instance, third-party web sites may be rewarded for driving consumer demand to a network of sellers.

However, in some marketplaces, supply is more difficult to come by, especially marketplaces that rely upon many different sellers. It may be advantageous when the seller or seller network is large and diversified enough to satisfy the customers generated through the demand affiliates.

In one embodiment of the present invention, a system rewards supply affiliates in addition to demand affiliates. The system provides a platform to attract and reward generators of both demand and supply.

In one embodiment, the system provides a user interface or application programming interface (API) through which suppliers of sellers can supply their sellers into the network. Affiliates can add their sellers to the network, manage their sellers from the system interface, and maximize the benefit they receive through manipulating the way they display network listings on their own demand sites, such as through manipulating the sorted order of the listings. A media channel delivering seller listings, advertisements or similar advertising information to the potential customers can be called a demand site.

In one embodiment, the system provides the supplier affiliates with tools to manage and track the performance of their sellers, both individually and as a whole. In return for supplying the sellers to the seller network, the system rewards the supply affiliates. In one embodiment, the supply affiliate reward is based on the leads received, or the commerce conducted through the network or other measurable benefits received, by the sellers of the supply affiliates. Supply affiliate reward can be manifested in various forms including, but not limited to, percentile commissions, revenue share on lead charges or commerce transactions, bounties, lump sums, etc.

In one embodiment, a supply affiliate can be anyone with access to existing or potential sellers that may be brought into the seller network. For example, a supply affiliate can be an individual who recommends friends to join the network. A supply affiliates can also be a company which pools and manages a set of sellers for the network.

In one embodiment, a supply affiliate of the seller network with a supply affiliate reward system can display seller listings from the seller network on a media channel of the supply affiliate. The seller listings may include the sellers from the supply affiliate and/or from other supply affiliates of the seller network.

In general, a supply affiliate may or may not operate a demand site. When a supply affiliate facilitates a demand site for the seller network, the supply affiliate is also a demand affiliate. In return for facilitating the demand site to reach potential customers, the system also rewards the demand affiliates. In one embodiment, similar to the supply affiliate reward, the demand affiliate reward is based on the leads received, or the commerce conducted or other measurable benefit received, by the sellers through the demand site. The demand affiliate rewards can be manifested in various forms including, but not limited to, percentile commissions, revenue share on lead charges or commerce transactions, bounties, lump sums, etc.

In one embodiment of the present invention, the seller listings are sorted based on maximizing the revenue to the demand affiliate who may also be a supply affiliate, considering both supply affiliate reward and demand affiliate reward, rather than relying on a bidding order of the sellers. Thus, the affiliates may achieve maximum benefit within a seller network.

If all the direct advertisers were unconditionally sorted ahead of the indirect advertisers, greater revenue potential from higher-bidding advertisements from indirect advertisers might be lost.

If the relevant advertisers were sorted according to a strict bidding order, the financial implications of some affiliates of a seller network with a revenue share system might not be well considered. For example, a demand affiliate who is also a supply affiliate may be losing out by not getting the higher revenue from their own sellers, who, although may have lower bids, would provide both the demand affiliate reward and the supply affiliate reward to generate a higher overall revenue for the affiliate. This would create an uneven distribution of seller impressions on demand sites; and suppliers of sellers with demand sites might lose out on potentially greater revenues.

In one embodiment of the present invention, the seller listings (or in general, advertisements) are sorted at a demand site according to the revenue for a particular party in the seller network, such as a demand affiliate who may or may not be a supply affiliate, to overcome the limitations of the traditional sorting methods.

In one embodiment, when the demand affiliates sort the seller listings of a seller network to increase their respective revenues, the system effectively gives sellers better exposure on the demand sites of their suppliers, while still having a wider distribution of demand site impressions. The network effect can be maximized. The sellers can be displayed on various possible demand sites of the network, while less aggressive lower-bidding sellers can still rely on an advantage on the demand sites of their own supplier. This creates value for the entire network, but also ensures suppliers of sellers with demand sites that they can achieve the maximum amount of revenue for their position in the network.

In one embodiment, the affiliates can access the system to see reporting interfaces that encapsulate both the performance of their sellers and the subsequent supply affiliate rewards.

Note that in the present application, "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Further details are provided below.

In one embodiment of the present invention, affiliates can upload their sellers into a seller network, manage their sellers and maximize the total revenue using a new sorting method (e.g., when displaying network listings on the demand site of an affiliate who is both a supply affiliate and a demand affiliate).

In one embodiment, to get suppliers of sellers integrated into a network, the system provides a user interface or API through which supply affiliates can set up or upload their sellers into the network. The system interface provides tools for the supply affiliates to manage and track the performance of their sellers, both individually and as a whole. In return for supplying the sellers, the system rewards the supply affiliates based on the received leads or conducted commerce in the forms of percentile commissions, revenue share on lead charges or commerce transactions, bounties, lump sums, etc.

A supply affiliate who owns demand sites in the network has several ways to achieve revenue/kickbacks, including: (1) getting kickback when a seller from the affiliate is connected to a consumer through the network on someone else's demand site (supply affiliate reward), (2) getting kickback when a seller from another affiliate is connected to a consumer on the demand site of the affiliate (demand affiliate reward), and (3) getting kickback when a seller from the affiliate is connected to a consumer through that the demand site of the affiliate (both the supply and demand affiliate kickbacks). Of these three scenarios, the supply affiliate can affect the relative frequencies of (2) and (3) by adjusting how the seller listings from the network are displayed on the affiliate's own demand sites to favor listings that increase total revenue, which may be from both supply and demand affiliate rewards or from only demand affiliate rewards. To achieve increasing benefit on the demand sites, the affiliates can sort network listings based on maximizing revenue potential for themselves, rather than relying on a strict bidding order. Given this position within the network, the sorted order implemented for displaying network listings on the demand sites effectively functions as a lever for controlling the revenue stream. Affiliates can exploit such a control to maximize revenues for themselves. Further, affiliates may access the system to see reporting interfaces that encapsulate both the performance of their sellers and the subsequent rewards to the supplier.

In one embodiment, a supplier of sellers can be a large-scale supplier, such as an advertiser supply company, or a single person taking part in a "seller referral program." For example, an individual person who brings in one seller to the network through referral and earns some percentage of kickback is also a supplier or supply affiliate. Thus, suppliers can be in a number of different forms.

In this description, the notion of a "seller" is independent of which party is paying for the network's services. For example, a lawyer who is advertising his/her business may pay for leads generated through an advertising network. On the other hand, the same lawyer may exist as a seller in an advice network where buyers pay for his/her consultation delivered through the network. In general, a seller can be a seller of products, goods, services, advices, etc., at an online or offline marketplace. An affiliate who brings such a seller to the marketplace is bringing value to the network, and therefore may be rewarded with a supply affiliate reward.

In one embodiment, the seller network is used to deliver seller listings (and in general, advertisements for the sellers) to potential customers. In one embodiment, the communications to obtain the seller listings are coordinated through the network. A seller network may distribute seller listings through various channels including, but not limited to, distribution on search-based web sites on the Internet, Wireless Application Protocol (WAP) servers, an Interactive Voice Response (IVR) telephony voice portal serving advertisements, an interface through which a live operator communicates seller listing information to customers, or print media, etc. Once the seller listing is presented to the customer, the connection between the customer and the seller can be performed through any type of communication medium including, but not limited to, phone calls (e.g., conventional landline based telephonic connection, wireless cellular connection, Voice over Internet Protocol (VoIP)), chat, video calls, e-mails, text messages, etc.

In one embodiment, seller listings (and in general, advertisements for the sellers) are sorted to maximize revenue for the owner of a demand site. Based on data attributes available to the owner of the demand site, many variations in sorting can be implemented. Some examples are provided below. In general, the listing data available to an affiliate is sorted according to the potential of total revenue to the affiliate to maximize revenue for the affiliate.

For example, consider a network in which sellers have set prices/bids for placement of their listings, and demand sites achieve a higher revenue percentage on transactions through the network if they are also the supplier of the seller listing. A given demand site may make 40% of the revenue when a transaction is completed from that demand site between a customer and an arbitrary network seller who was not supplied by the affiliate who owns the demand site, and 60% when the network seller was also supplied by the affiliate who owns the demand site. In this case, seller listings can be sorted for the demand site of the affiliate in decreasing order based on the potential total revenue for the affiliate, which may be computed from multiplying the seller listing bid by the percentage of revenue the affiliates makes from a transaction associated with that listing.

The seller network may also track click-through-rates, which shows the ratio of the number of user clicking through the links of the advertisement over the number of advertisement presentations. Click-through-rate represents the likelihood of a click-through resulting from the advertisement.

Similarly, when the advertisement is charged on the telephonic connections made as a result of the advertisement, call-through rate can be tracked and used to indicate the likelihood of a telephonic call resulting from the advertisement.

When an indicator of the likelihood of generating revenue from an advertisement for an affiliate is available, such as click-through-rates or call-through rates, the potential total revenue for the affiliate from an advertisement can be better estimated based on such statistical data. For example, the potential total revenue for the affiliate can be computed from multiplying the seller listing bid by the percentage of revenue the affiliate makes from a transaction associated with that listing and further by the indicator of the likelihood of generating revenue from that listing.

Thus, based on the revenue splitting schemes and/or the statistical data of revenue generating ratios, etc., the seller listing can be sorted to increase the total revenue that may be generated.

In general, a distributor of seller listings (and in general, advertisements) can utilize a system of the present invention regardless of supplier type, seller type, distribution method, and communication medium. Various detailed methods can be used in sorting the listings to increase revenue for a specific party of the system. When the affiliate has access to a number of sellers for displaying or distributing seller listings from the network, the affiliate can manipulate the sort order in the displaying of seller listings to maximize revenue to the supplier.

In one example, company X is an online marketing company that signs up and manages a number of advertisers, and distributes their advertisements (seller listings) through Company X's demand sites. The company decides to take its pool of sellers and function as a supply partner to a larger advertising network. With this arrangement, Company X displays advertisements from the network's advertisers on Company X's demand sites; and Company X's supply of advertiser listings will be displayed on other demand sites throughout the network. After making this decision, Company X accesses the network's system and uploads their advertiser listings into the network. Using the network's system, Company X can manage the listings and view reports of the performance of each of the individual listings as well as their performance as a supply affiliate.

Within the system, Company X's supply of sellers can be added to the pool of network advertisers for display on other demand sites; and Company X displays advertisements from the pool of the network's listings. Advertisers place bids for each of their listings which represent how much they are willing to pay for a customer lead through the network. When a transaction with one of Company X's advertiser's listings occurs on a different demand site (not owned by Company X), Company X receives 20% of the bid amount. However, when a transaction occurs on one of Company X's demand sites, they receive 40% of the bid amount if the listing was not from their supply, and 60% of the bid amount if the listing was from their own supply. The balance between transactions on Company X's demand sites that yield 40% and 60% effectively functions as a lever through which Company X can affect the revenue stream from their demand sites. In other words, Company X can potentially earn more from their demand sites by increasing the frequency of transactions that yield 60% relative to the frequency of transactions that yield 40%, if the bid amounts are about the same.

Company X previously sorted strictly by bid to display advertisements on Company X's demand sites. This might be sufficient before Company X joins the network. However, Company X is now a part of a large network where the revenue split varies for different sellers. According to one embodiment of the present invention, Company X may implement a new method of sorting the listings to increase revenue. For example, the listings can be sorted based on the bid amount multiplied by the percentage of revenue Company X receives.

If the previous sorting method were used, Company X would suffer the opportunity costs of not giving precedence to lower-bidding, higher-revenue-yielding listings over listings with higher bids but lower revenue yield. For example, using the old method a listing from a different supplier in the network with a $10 bid would be placed higher than a listing from Company X's supply with a $9 bid. Using the new method, the $9 bid listing would be placed higher. This is because Company X would effectively earn $5.40 when the customer communicates with the $9 advertiser, but only $4.00 when the customer contacts the $10 advertiser. Using the new method, the listings on the demand sites of Company X are sorted in a way to provide the most exposure for listings of the highest revenue yield for Company X.

Thus, the system allows suppliers of sellers with demand sites to maximize their revenue within a network that utilizes supply affiliate kickbacks. By implementing a revenue-maximizing sort order on their demand sites, a supplier may achieve an optimal revenue-yielding position within the network.

In general, applicability of embodiments of the present invention is independent of supplier type, seller type, distribution method, communication method, or minor variations in sorting criteria. To illustrate this point, consider the following separate example.

Company Y runs a web site that functions as a service marketplace to bring together buyers and sellers of live advice. Company Y manages hundreds of advisors who have listings to sell live tax advice through VoIP calls to customers at a set per-minute rates (each listing has its own rate). Company Y decides to join a large network of live advisors which includes business advice, psychic readers, etc. Company Y then uploads their live tax advisor listings into the network and manages them through the network system interface. Now Company Y's tax advisors can have their listings displayed on all of the demand sites in the network; and, Company Y also displays the listings for other advisors in the network on Company Y's own demand sites using Company Y's own sorting scheme. The network also distributes listings through other mediums as well, such as displaying on various mobile devices.

Previously, Company Y earned a fixed percentage of the total transaction charge and sorted the listings purely based on the per-minute rate that advisors charge for their services. However, Company Y is now a part of a large network with supply partner kickbacks. According to one embodiment of the present invention, Company Y can implement a revenue-maximizing rule for sorting lists on their demand sites.

As the supply affiliate part of the network contract, Company Y earns 20% of the revenue from transactions initiated through their demand sites if the advisor is a network seller not from their supply, and 30% of the revenue from transactions initiated on their demand sites where the advisor is from their supply. On the demand sites of Company Y, the listings are now sorted in descending order of (advisor rate)×(revenue split). Thus, a tax advisor listing from Company Y's supply charging a rate of $5.00 per minute would be placed higher than another advisor listing from the network (but not from Company Y's supply) that charges a rate of $6.00. This is because Company Y would earn $1.50 per minute on transactions between customers and the $5.00 per min advisor, but only $1.20 per minute on transactions between customers and the $6.00 per min advisor.

The above examples demonstrate how a supplier of sellers can maximize the revenues earned on demand sites of the supplier when the supplier is within a large seller network that utilizes supply partner kickbacks. The benefit is provided to suppliers of sellers in second example as it does in the first one, even though the above examples have different types of sellers, distribution methods, and communication methods, etc.

In one embodiment, the sellers of a supply affiliate can be added to the network pool of sellers, through a system-provided interface or API, which may include mass upload functionality and/or individual add/delete functionality.

FIG. 1 illustrates a seller network according to one embodiment of the present invention.

In FIG. 1, seller databases of supply affiliates (e.g., 105, 115) can be uploaded (e.g., 107, 117) into the seller network database (120). For example, seller database of supplier affiliate S (105) may include a list of sellers (e.g., 101) with seller price bids (e.g., 103). Similarly, seller database of supplier affiliate Y (115) may include a list of sellers (e.g., 111) with seller price bids (e.g., 113).

In one embodiment, the supply affiliates may upload/supply their sellers into the seller network using different interfaces, such as a user interface which allows the manipulation of individual seller records, or an API that allows mass uploading. For example, seller records may be updated, added or deleted one at a time. Alternatively, the seller records may be submitted in a file transmitted through a network connection; and the file of seller records is then parsed for adding, deleting, and/or updating the seller records. For example, the file can be in an Extensible Markup Language (XML) or in a custom format.

In one embodiment, different supply affiliates may provide different types of seller records. For example, a supply affiliate in a referral program may provide the identity of the sellers. When the sellers join the network, the supply affiliate is rewarded with supply affiliate reward for the referral effort. Thus, in general, the supply affiliate may or may not provide the seller price bid information.

In the example of FIG. 1, the seller network database (120) includes the information of sellers (e.g., 121), seller price bids (e.g., 123), supply affiliates (e.g., 125) from whom the sellers are supplied to the network, supply affiliate rewards (e.g., 127) which are to be rewarded to the corresponding supply affiliate from revenue generated according to the seller price bids (123), demand affiliate rewards (e.g., 129) which are to be rewarded to the corresponding demand affiliate from revenue generated according to the seller price bids (123), and other information, such as click-through rates, call-through rates, etc.

In one embodiment, the supply affiliate rewards may be different percentages of the seller price bids for different sellers or for different supply affiliates. Alternatively, the supply affiliate reward for all sellers, or all sellers of a particular supply affiliate, may have the same percentage based on the seller price bids. Thus, sellers or certain groups of sellers may share the same data about supply affiliate rewards.

Similarly, sellers or seller groups may also share the same data about demand affiliate rewards.

Thus, in general, the seller network contains information about revenue sharing among various parties in the network, which may be organized different from that illustrated in FIG. 1.

In one embodiment, the seller network specifies the supply affiliate rewards and the demand affiliate rewards. For example, for supply affiliate of a referral program, the supply affiliate rewards may be a predetermined percentage (e.g., 5%) of the seller price bids. In one embodiment, supply affiliates may specify the supply affiliate rewards. For example, a supply affiliate may specify a percentage of seller price bids as the supply affiliate rewards, which can be adjusted by the supply affiliate to balance the revenue from individual transaction and the likelihood of successful transaction. When the supply affiliate reward is reduced, the demand affiliate reward can be increased; and the sellers of the supply affiliate are more likely to be displayed on the demand sites of other affiliates.

Similarly, the demand affiliate rewards may also be specified by different parties, such as the seller network, the supply affiliates, the demand affiliates, etc.

In one embodiment of the present invention, one same seller may be supplied to the seller network by different supply affiliates. To include the seller's listing, demand affiliates may select the supply affiliate according to the supply affiliate reward and/or demand affiliate reward.

In one embodiment, the seller network tracks the statistic data about transactions (e.g., click-through rates, call-through rates, etc.). The demand affiliates may use the statistic data in computing potential revenues when sorting seller listings. The supply affiliates may use the statistic data to evaluate the performance of their sellers.

Alternatively, the supply affiliates may track the statistic data about transactions and provide the data to the seller network.

In one embodiment of the present invention, the demand affiliates of the seller network use (e.g., 131, 133) the seller network database to present seller listings for their users. For example, the media channel of supply affiliate S (135) (e.g., Web/WAP server) may deliver seller listings to user devices A (141) (e.g., computer), user device B (143) (e.g., PDA), etc., in response to the search requests from the users; and the media channel of supply affiliate Y (137) (e.g., SMS based server) may provide seller listings to user device B (143), user devices X (149) (e.g., cellular phone), etc.

In one embodiment, certain entities can be both demand affiliates and supply affiliates of the seller network. For example, in FIG. 1, affiliates S and Y are both supply affiliates and demand affiliates, since they both supply sellers to the network and presents seller listings using the seller network database.

In general, some demand affiliates may not be supply affiliates; and some supply affiliates may not be demand affiliates.

In one embodiment of the present invention, the seller listings are sorted according to total potential revenues for the demand affiliate, which may include both the supply affiliate reward and the demand affiliate reward.

In one embodiment, the seller network sorts the seller listings for the media channel according to an indicator of total potential revenue for the affiliate. Thus, a uniform sorting method can be applied to the media channels of the seller network.

Alternative, the seller network provides the indicator of total potential revenue to the demand affiliates, in addition to the seller price bid or instead of the seller price bid, to allow the demand affiliates to sort the listings according to their own criteria.

Alternatively, different demand affiliates may sort the seller listings differently according their own indicators of total potential revenue.

Figure 2:
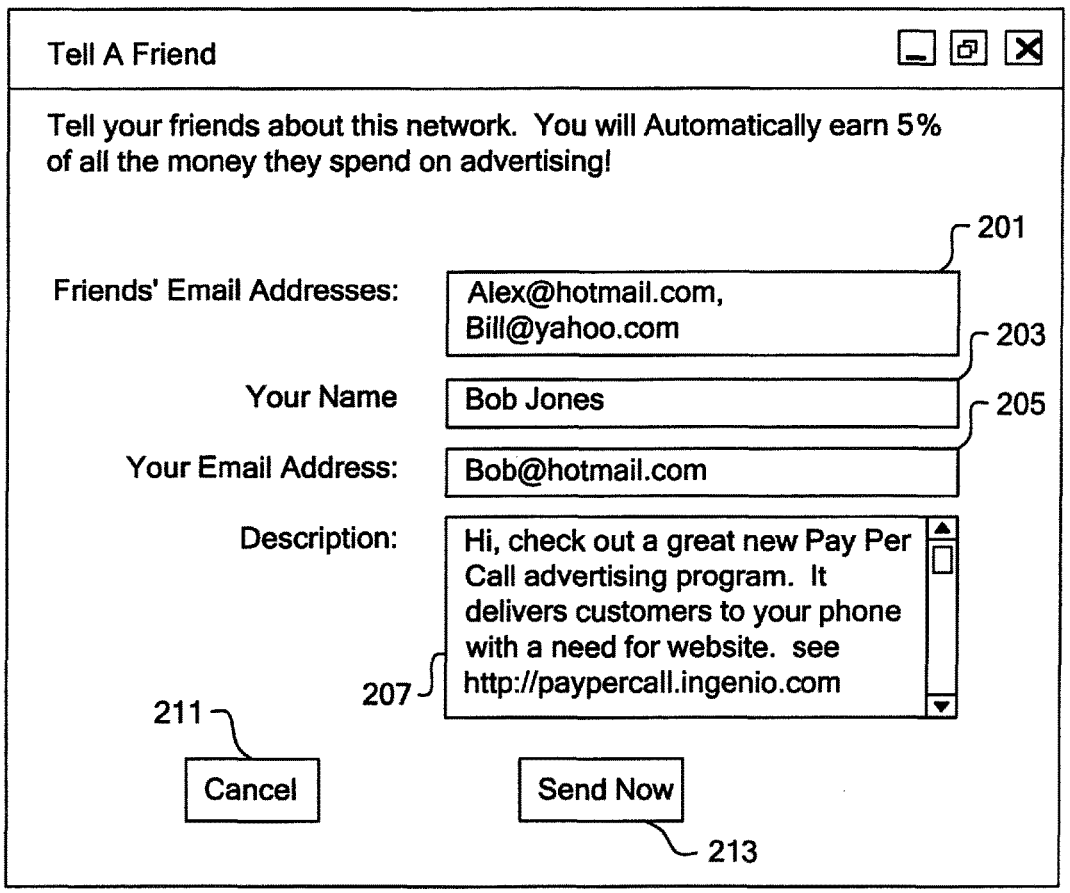
FIG. 2 illustrates a user interface to provide information about sellers from a supplier of a seller network according to one embodiment of the present invention.

FIG. 2 illustrates a user interface to provide information about sellers from a supplier of a seller network according to one embodiment of the present invention.

In FIG. 2, a supply affiliate is in the form of a participant of a referral program. The supply affiliate composes a message to friends through a user interface (200), such as a web page, a web-based email, a custom application program, etc. The "your name" field (203) and "your email address" field (205) are to receive the name and email address of the supply affiliate. The "friends" email addresses" field (201) is to receive a list of email address (e.g., separated by ","). The "description" field (207) is to receive a personalized message from the supply affiliate for referring the network (e.g., a pay per call advertising program).

When the "send now" button (213) is pressed, the personalized message received in the "description" field (207) is sent to the friends of the supply affiliate at the addresses specified in the "friends' email address" field (201). In one embodiment, the emails are sent in a way so that the emails appear to be sent directly from the supply affiliate as indicates in fields (203 and 205).

In one embodiment, a link containing parameters to identify the supply affiliate is added into the email message so that when the friends of the supply affiliate follows the link in the email to join the network, the system adds the friends as sellers of the supply affiliate. The supply affiliate automatically earns a percentage (e.g., 5%) of the money the friends spend on the network as supply affiliate rewards.

Alternatively, a reference number/string can be added to the email message which can be used by the friends to identify the supply affiliate. Alternatively, the email addresses of the friends can be used to correlate the friends with the supply affiliate when the friends join the network.

In one embodiment, the friends set up their advertisements and price bids for the advertisements directly with the network, without further help from the supply affiliate and in a way similar to direct advertisers of the network. However, a percentage of the advertisement spending of the friends goes to the supply affiliate for the referral effort.

Alternatively, the "cancel" button (211) can be pressed to close the interface without sending out the message.

Thus, a supply affiliate can represent a single individual, who may or not be a demand affiliate and who may have only one seller.

Figure 3:
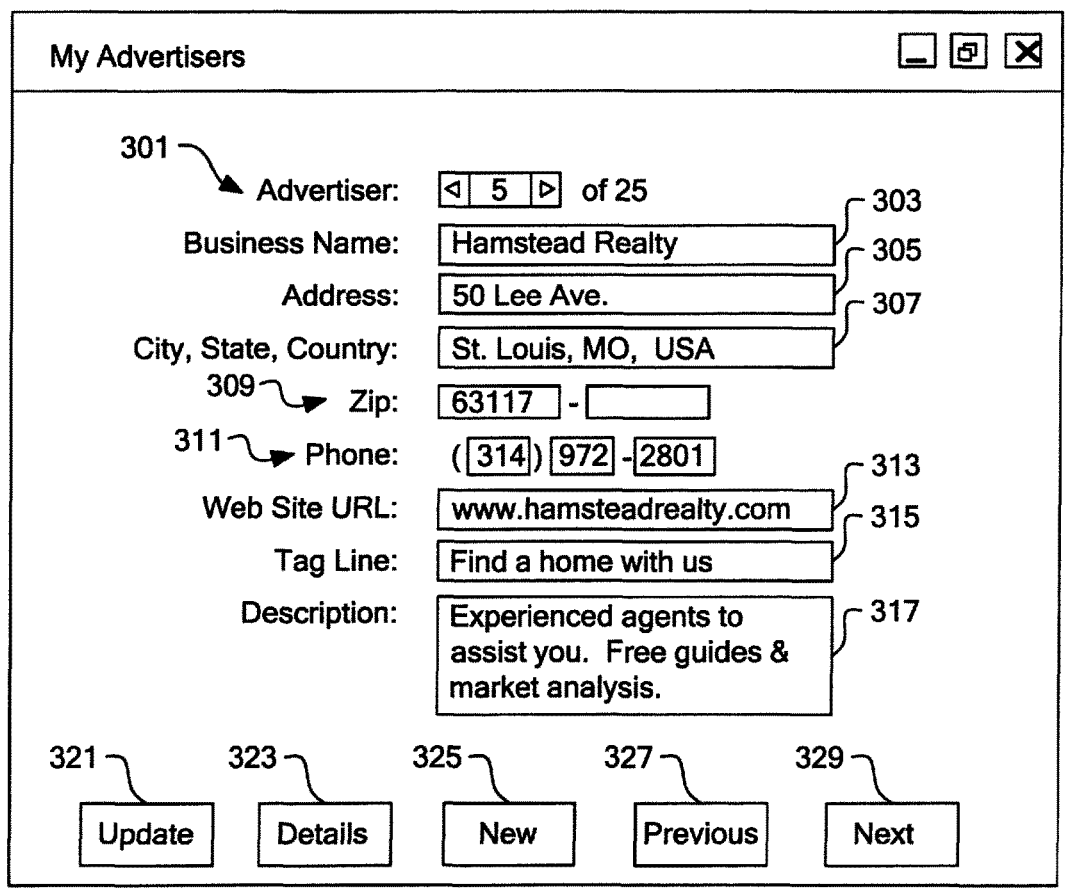
FIG. 3 illustrates a user interface to upload information about sellers from a supplier of a seller network according to one embodiment of the present invention.

FIG. 3 illustrates a user interface to upload information about sellers from a supplier of a seller network according to one embodiment of the present invention.

The user interface (300) allows a supply affiliate to individually access the sellers/advertisers of the supply affiliate. For example, a selector (301) can be used to select a particular advertiser of the supply affiliate.

In FIG. 3, in one embodiment, the user interface (300) is in the form of a web page rendered in a web browser of a user device, such as a computer, a notebook, a PDA, a web terminal, etc. The web page is to be downloaded from a server that is connected to the database for the advertisements. Alternatively, the user interface (300) can be based on a WAP application on a wireless mobile device, such as a cellular phone. Further, similar entry fields can be provided through the use of other communication channels, such as Email, Instant messages, SMS messages, etc. Further, an advertiser may fax a form, or make a telephone call, to provide the information to a human concierge, which uses such a user interface to enter the data into the database (e.g., using a custom application).

In FIG. 3, the user interface (300) contains entry fields for specifying the information an advertiser want to appear on the advertisement. The "business name" field (303) is to receive the name of the advertiser, which can be used to identify the advertiser in the database and in the advertisement.

The address, city, state, country and zip fields (305, 307 and 309) are to receive the location information about the advertiser. The location is typically a site where a potential customer may visit to obtain services and/or products.

The "phone" field (311) is to receive the telephone number at which the advertiser is to receive phone calls from potential customers. In one embodiment of the present invention, the phone number of the advertiser in the phone field (319) is not shown directly to the end users. An encoded/substitute phone number is used in the advertisement, so that when the encoded phone number is called the phone number of the advertiser is determined and connected to. This allows the tracking of phone calls generated from various advertisements for different advertisers and/or generated through different advertisement delivery channels.

The "web site URL" field (313) is to optionally receive a home web page address of the advertiser. In one embodiment, the advertisement is generated to contain a link to the web page as specified in the web site URL field (313) so that if the end user wants further details about the advertiser, the end user may click the link to visit the web page of the advertiser. In one embodiment, the advertiser is not charged for the link directing the web user to the web page of the advertiser. Alternatively, the advertiser may be charged for the link that is clicked to lead the web user to the web page of the advertiser. In one embodiment, the amount the advertiser is charged for the click is automatically computed from the pay per call price according to the click-through rate and call-through rate so that the average click-through revenue and the average call-through revenue is about the same.

In one embodiment of the present invention, the advertisement is not to include a link to the web site URL (313). The web site URL (313) is used to obtain further information about the business of the advertiser so that the advertisement can be placed in relevant media channels.

For example, the web pages at the web site according to the web site URL can be fetched and analyzed automatically to determine topics, categories, keywords, content, etc., so that the placement of the advertisement can be based at least partially on the topics, categories, keywords, content, etc. to increase the chances of the advertisement being of interest to the targeted users.

The "tag line" field (315) and the description field (317) are to receive one or more concise statements about the business offering, the unique ways of meeting customers' needs, how the business stand out from the competition, etc. In one embodiment, the information in the description field is presented in a text form. In one embodiment, the text in the description field can be enhanced with boldface and italic type, as well as formatting, using a Rich Text Editor, as supported by Internet Explorer for Windows or Mozilla Browsers (e.g., Firefox, Netscape, etc.).

In one embodiment, further optional information, such as a logo, an electronic coupon, etc. (not shown in FIG. 3), can be specified for the advertisement. In one embodiment, to provide an electronic coupon, one can simply specify a coupon headline, description and expiration date (if any). The coupon information is then store in the database and presented with the advertisement.

For example, when the "details" button (323) is pressed, a user interface for show further details is displayed. Further details may include electronic coupon information, price bid for advertisement, logo, advertisement budget (e.g., in terms of the number calls per day, monthly spending limit, etc.), targeted geographic area(s) of customers, business categories, key terms, etc.

In one embodiment, the "details" button can be further pressed to view information collected by the network for the supply affiliate, such as advertisement performance (e.g., call-through rate, total number of calls generated in a given time period, total charges/advertisement spending, rewards for the affiliate from the advertiser, etc.)

The "previous" and "next" buttons can be used to navigate through the set of advertisers of the supply affiliate. The "new" button can be used to enter information for a new advertiser of the supply affiliate; and the "update" button can be used to update information of an existing advertiser of the supply affiliate. Further buttons, such as a "delete" button for removing an advertiser, can be included.

In one embodiment, the seller network system further provides an API for the mass updating/uploading of seller information from a supply affiliate. For example, the supply affiliate may use its own application system to collect data about the sellers. The seller information is then communicated to the seller network through a file, or a network communication interface.

FIG. 4 illustrates a user interface to display affiliate earnings of a supplier of a seller network according to one embodiment of the present invention.

In FIG. 4, a sample reporting interface (400) displays statistics regarding the performance of the seller listings of a supply affiliate and the subsequent revenue to the supply affiliate. From here, the supply affiliate can track the performance of its sellers and the resulting supply affiliate earnings (427 and 429).

For example, the supply affiliate may separate the advertisers into a number of groups and select (401) a group or all groups for viewing. Different types of calls generated from the advertisements for the selected advertisers can be viewed separated or together using the "call results" selector (403). The "display as" selector (405) can be used to specify whether the result is displayed as a web page, an XML document, an email, a fax, a PDF file, etc. Time period selectors (407 and 409) can be used to specify a particular time period for which the activities are reported.

After specifying the parameters of the report, the user can press the "create report" button to obtain the result, which shows information such as the list of advertisers (420) and their corresponding calls (421) received as the result of the advertisement on the seller network, call charges (423 and 425) and affiliate earnings (427 and 429) for the affiliate, etc.

Figure 5:
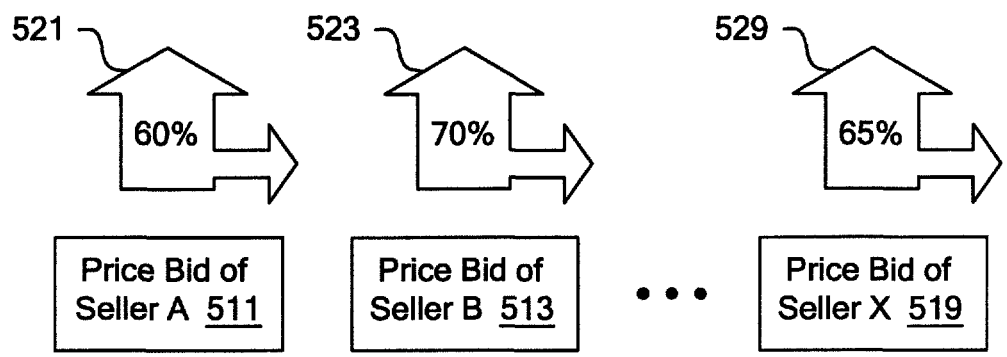
FIG. 5 illustrates a revenue distribution scheme in a seller network according to one embodiment of the present invention.

FIG. 5 illustrates a revenue distribution scheme in a seller network according to one embodiment of the present invention.

In one embodiment of the present invention, as illustrated in FIG. 5, the sellers to be listed/presented/advertised in a media channel provide different percentages (e.g., 521, 523, 529, etc.) of contributions out of the price bids (e.g., 511, 513, 519, etc.) of the sellers to the revenue (501) for the media channel. The revenues generated from the price bids of different sellers are distributed differently to multiple parties. Thus, an order of the price bids of the sellers does not represent an order of revenue potential for the media channel.

In one embodiment of the present invention, the sellers are sorted into a list based at least partially on an indicator of revenue potential, which includes the consideration of the differences in contributions from the price bids to the revenue for the operator of the media channel.

Figure 6:
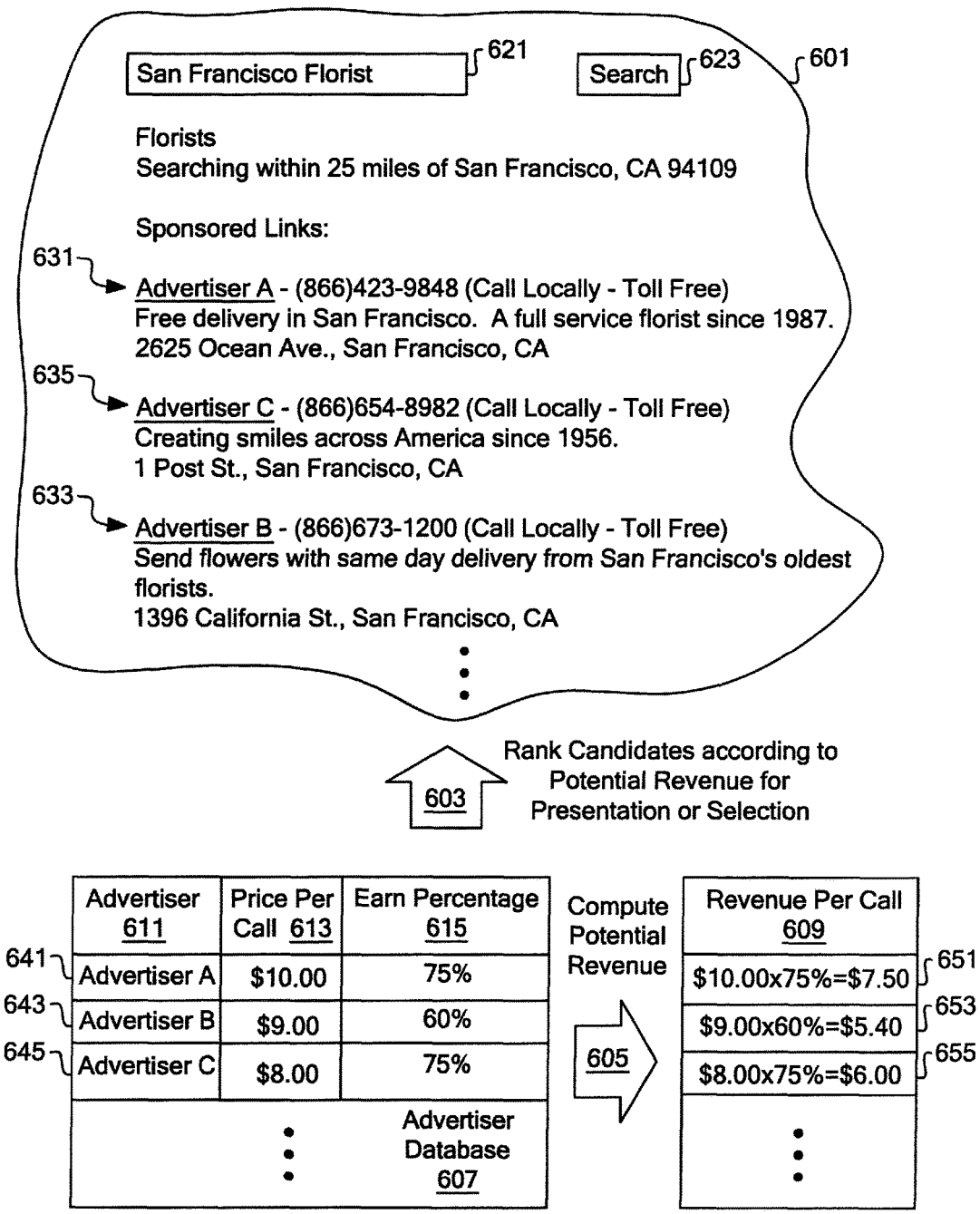
FIG. 6 illustrates a list sorting process to increase revenue for a media channel in a seller network according to one embodiment of the present invention.

FIG. 6 illustrates a list sorting process to increase revenue for a media channel in a seller network according to one embodiment of the present invention.

In FIG. 6, the advertiser database (607) includes a table of advertisers (611) with corresponding price per call (613) and earn percentage (615) for a media channel. To sort the advertisers, the potential revenue is computed (605). Revenue per call (609) indicates the amount that the media channel can earn out of the advertisements of the corresponding advertisers (611). For example, advertiser A (641) provides revenue per call of $7.50 (651), which is the product of the corresponding price per call and earn percentage.

In the example of FIG. 6, it is seen that the order of the revenue per call can be different from the order of price per call. For example, advertiser B (643) has a higher bid of price per call ($9.00) than advertiser C (645) ($8.00). However, advertiser B (643) has a lower earn percentage (60%) than advertiser C (645) (75%) for the media channel. As a result, the advertiser B (643) has lower revenue per call ($5.40) than advertiser C (645) ($6.00).

Interface (601) illiterates the display of seller listing according to one embodiment of the present invention. After the "search" button is pressed to request the results according to the search terms (621), the relevant advertisers are retrieved from the advertisement database. The candidates for the search results are ranked (603) according to the potential revenue (e.g., 609) for presentation or selection. For example, when the list of candidates is too long, only a top portion of the list is selected for presentation in the search result.

In the example of FIG. 6, the advertisers (631, 635 and 633) are listed in the interface (601) in a decreasing order according to the revenue per call (609), instead of the price per call (613). For example, the advertiser C (635) is listed ahead of the advertiser B (633), because the advertiser C has higher revenue per call (655) than the advertiser B, although the advertiser C has a lower price per call (613) than the advertiser B.

Figure 7:
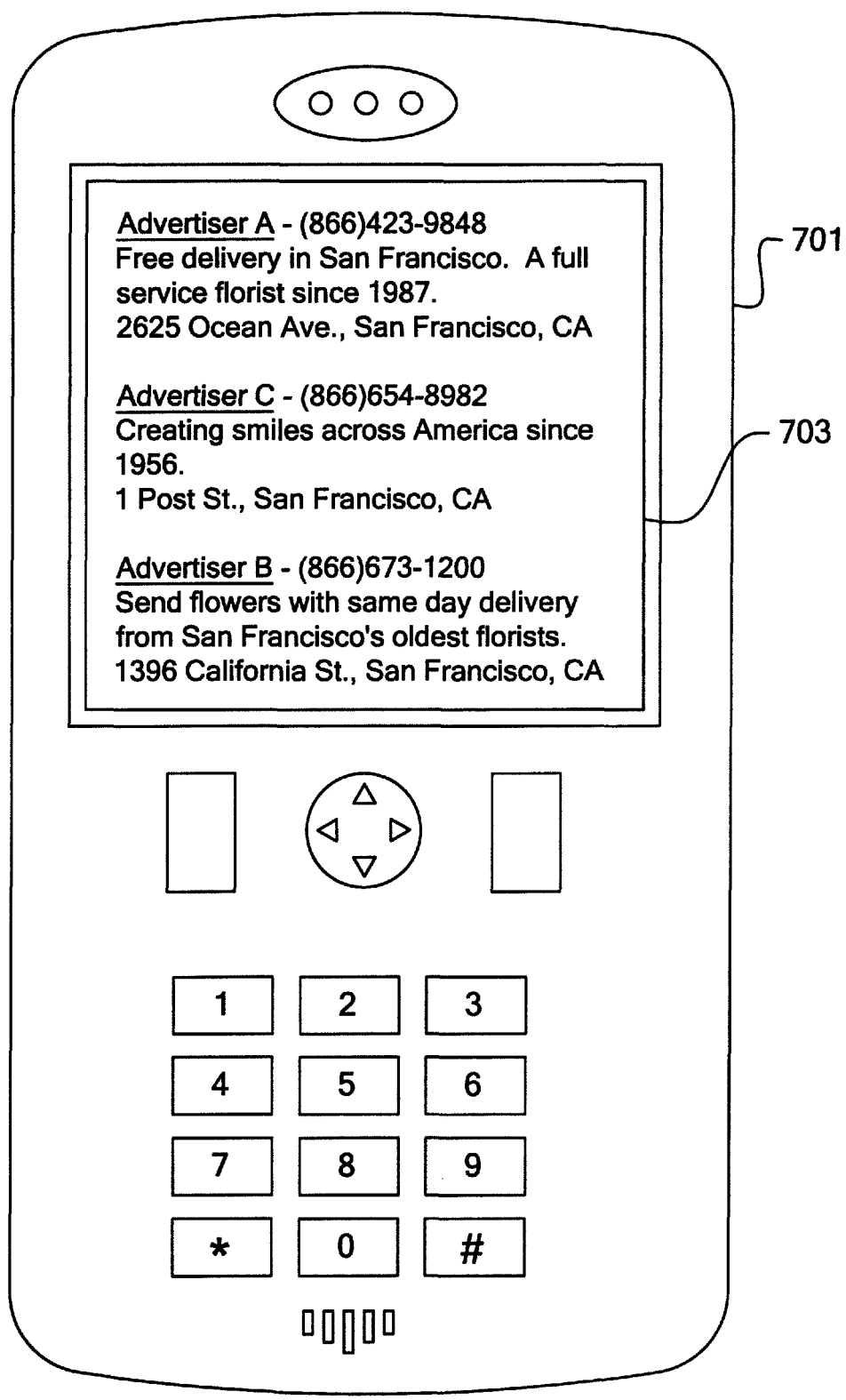
FIG. 7 illustrates an example of showing a list of sellers on a wireless mobile device in a seller network according to one embodiment of the present invention.

FIG. 7 illustrates an example of showing a list of sellers on a wireless mobile device in a seller network according to one embodiment of the present invention.

In FIG. 7, the seller listings (703) are presented on a mobile wireless device, such as a cellular phone (701). The list is sorted in a similar way as illustrated in FIG. 6. In one embodiment, the seller list is presented in response to a search submitted from the cellular phone to a webAWAP server, or a SMS based server. Alternatively, seller list may be presented as the mobile device enters a particular geographic area, in accordance with a preference of the user.

Figure 8:
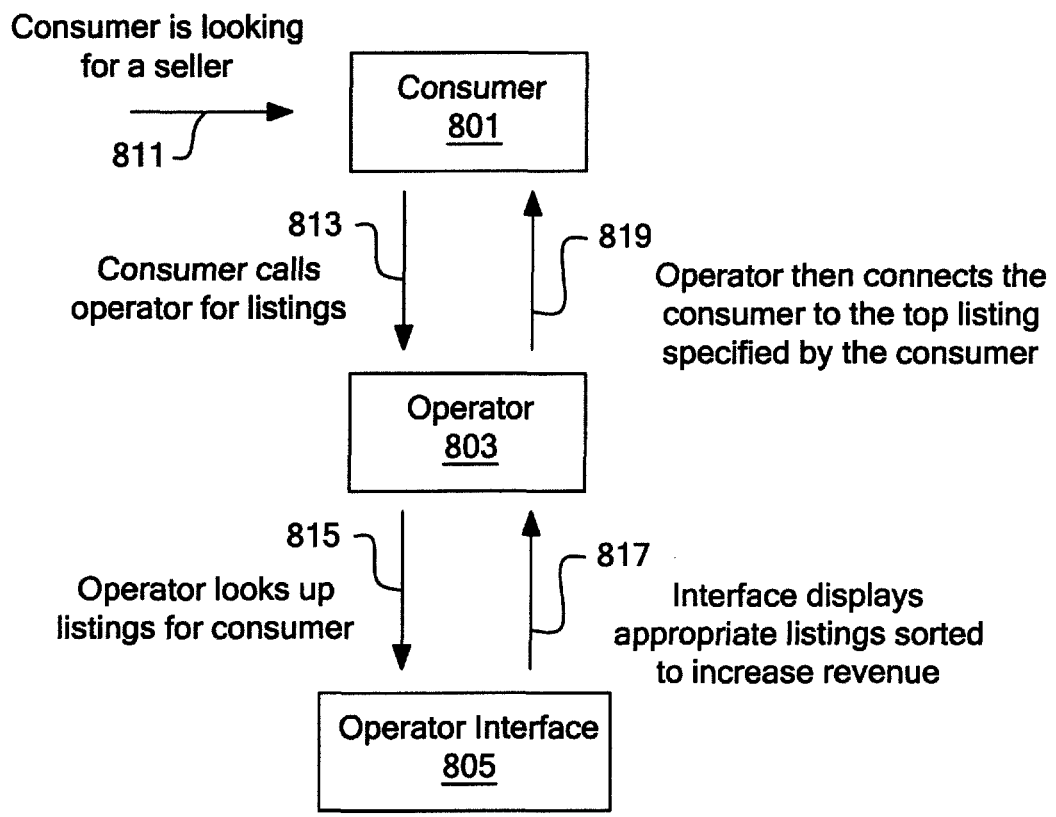
FIG. 8 illustrates a process of accessing sellers in a seller network according to one embodiment of the present invention.

FIG. 8 illustrates a process of accessing sellers in a seller network according to one embodiment of the present invention.

In FIG. 8, the consumer (801) may be looking (811) for a seller. The consumer calls (813) an operator for listings. The operation (803) looks up (815) listings for the consumer using an operator interface (805), which may be a custom application to access the seller network, or through a regular media channel, such as a web browser.

The interface displays (817) appropriate listings sorted to increase revenue for the operator. The operator (803) then connects the consumer to the top listing specified by the consumer.

Alternatively, the consumer may interactive with an IVR system using a voice recognition system and a text-to-speech system.

Thus, in general, the seller listings sorted according to embodiments of the present invention can be displayed or presented to various different entities, which may not be an end consumer.

In one embodiment of the present invention, the revenue share for the affiliates of a seller network is based on measurable events such as clicks on links provided in the listings/advertisements, phone calls generated from the listings/advertisements, etc.

In one embodiment, the seller network system tracks the measurable events and determines the affiliate rewards for the affiliates of the network. Alternatively, the demand and/or seller affiliates may also track the measurable events.

In one embodiment, to track the clicks the links are encoded with one or more parameters which can be used to determine the target address; and the links point to a web site which accepts the requests, records the clicks, determines the target address and forwards the requests to the target address.

In one embodiment, to track the phone calls resulting from the listings/advertisements, the phone numbers provided in the advertisements/listings are encoded so that the phone calls are directed to a phone call tracking facility first.

Figure 9:
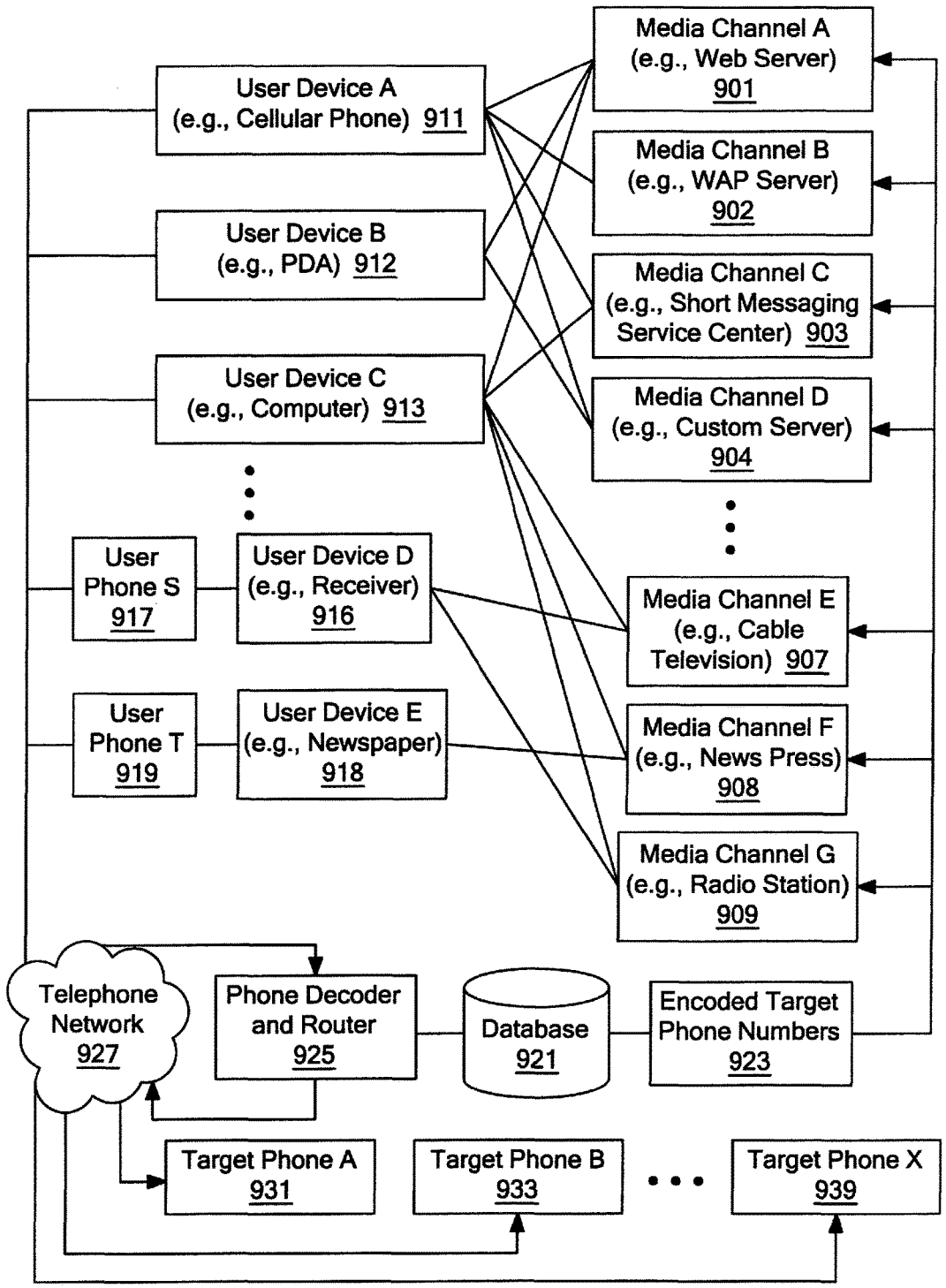
FIG. 9 shows a diagram of a system to make and track phone connections for a seller network according to one embodiment of the present invention.

FIG. 9 shows a diagram of a system to make and track phone connections for a seller network according to one embodiment of the present invention.

In FIG. 9, a database (921) may contain the phone numbers of target phone A (931), target phone B (933), ..., target phone X (939), etc. Typically, the target phones belong to the institutions, businesses, individuals, etc, which seek for publicity through various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment of the present invention, the phone numbers of the target phones are not directly publicized over the media channels. Instead, encoded target phone numbers (923) are used. Using the encoded target phone numbers (923), a user cannot reach target phones directly. The encoded target phone numbers (923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

For example, one media delivering channel includes print media. A list of advertisements can be sorted according to one embodiment of the present invention before printing (e.g., newspaper). In the example of print media, the list can be sorted to maximize advertisement revenue, although the sorting may not be dynamic in response to a request from an end user.

In another example, a voice portal is used to deliver the advertisements. The voice portal can use an Interactive Voice Response (IVR) system to interact with the user. For example, the IVR system may use voice-recognition or keypad input to receive user input. According to the user input, the advertisements can be sorted dynamically to maximize revenue according to one embodiment of the present invention. In one embodiment, the IVR system presents an advertisement through a text-to-speech technique. Alternatively, the advertisement can be a pre-recorded voice message.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S (917) or user phone T (919).

In one embodiment of the present invention, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment of the present invention, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (925) through the telephone network (927); and a second portion of the encoded target phone number is to be decoded by the phone decoder and router (925). For example, the Dual Tone Multi-Frequency (DTMF) decoder can be installed in the phone decoder and router (925) to detect the second portion of the encoded target phone number dialed at the user phone. The detected phone number can then be used to recover the target phone number.

When an encoded target phone number has more digits than a standard phone number, the additional digits can be implemented as a telephone extension, or as an IVR system.

In one embodiment of the present invention, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with a number mapped from an identifier of the media channel. To prevent the user from dialing the target phone number directly, an encryption/scrambling scheme can be used to encode the second portion, which is decoded at the phone decoder and router (925).

In one embodiment of the present invention, the phone decoder and router (925) determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 9, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

Figure 10:
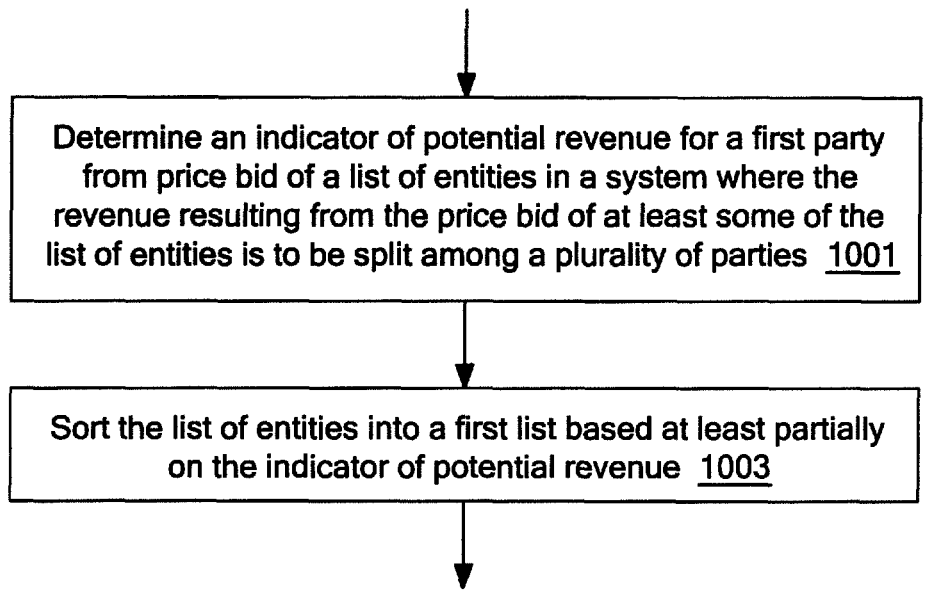
FIGS. 10-11 show flow diagrams of methods to sort seller listings according to embodiments of the present invention.
Figure 11:
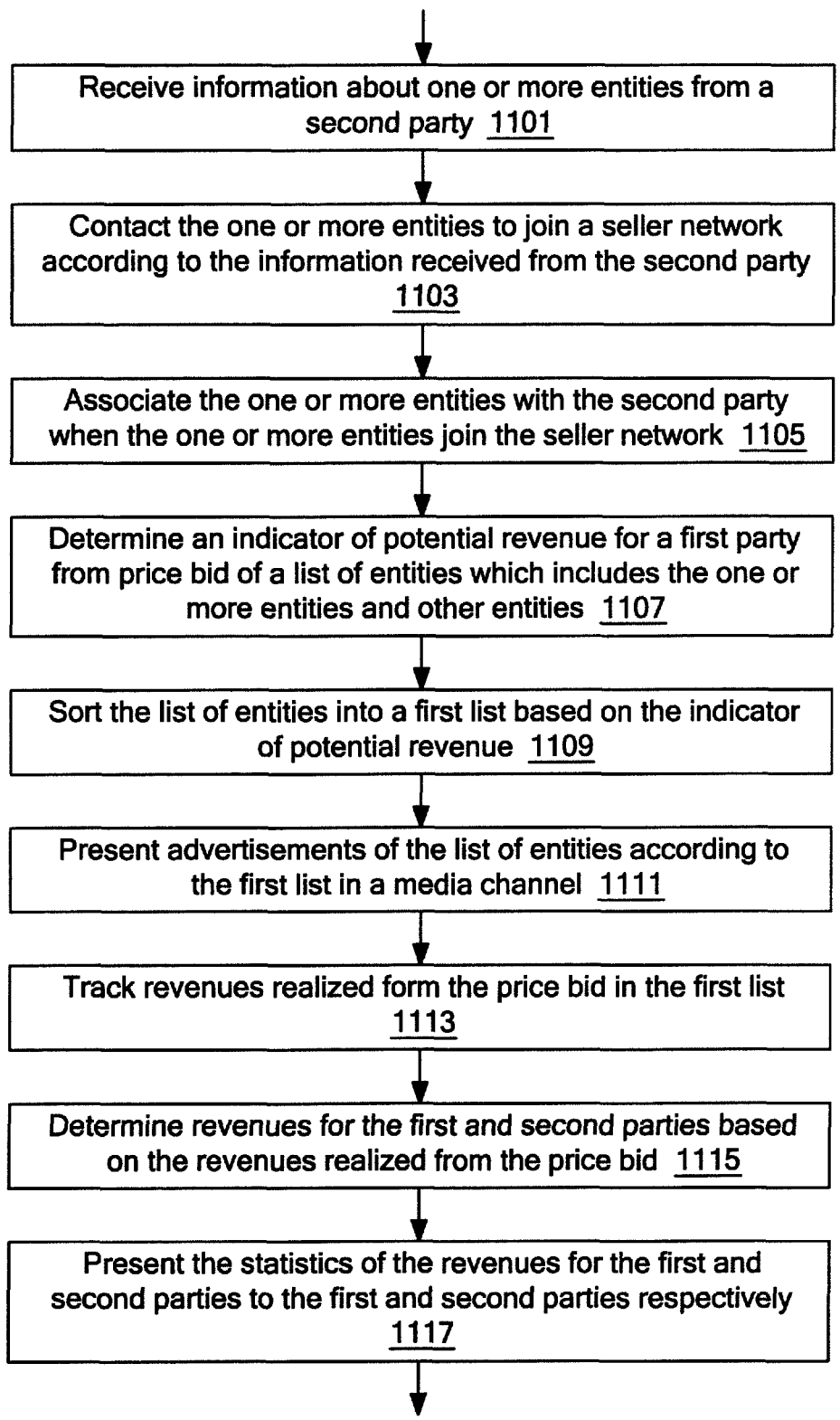

FIGS. 10-11 show flow diagrams of methods to sort seller listings according to embodiments of the present invention.

In FIG. 10, operation 1001 determines an indicator of potential revenue for a first party from price bid of a list of entities in a system where the revenue resulting from the price bid of at least some of the list of entities is to be split among a plurality of parties. Operation 1003 then sorts the list of entities into a first list based at least partially on the indicator of potential revenue.

In FIG. 11, operation 1101 receives information about one or more entities from a second party. Operation 1103 contacts the one or more entities to join a seller network according to the information received from the second party. Operation 1105 associates the one or more entities with the second party when the one or more entities join the seller network.

Alternatively, the second party may poll and manage the one or more entities and upload the entities to the seller network.

Operation 1107 determines an indicator of potential revenue for a first party from price bid of a list of entities which includes the one or more entities and other entities. Operation 1109 sorts the list of entities into a first list based on the indicator of potential revenue. Operation 1111 presents advertisements of the list of entities according to the first list in a media channel.

The one or more entities and other entities may contribute different percentages of the price bid to the revenue of the first party. For example, the price bid for the one or more entities is to be slit between the first and second parties; and the price bid for the other entities is not to be slit between the first party and another party.

Operation 1113 tracks revenues realized from the price bid in the first list. Operation 1115 determines revenues for the first and second parties based on the revenues realized from the price bid. Operation 1117 presents the statistics of the revenues for the first and second parties to the first and second parties respectively.

Figure 12:
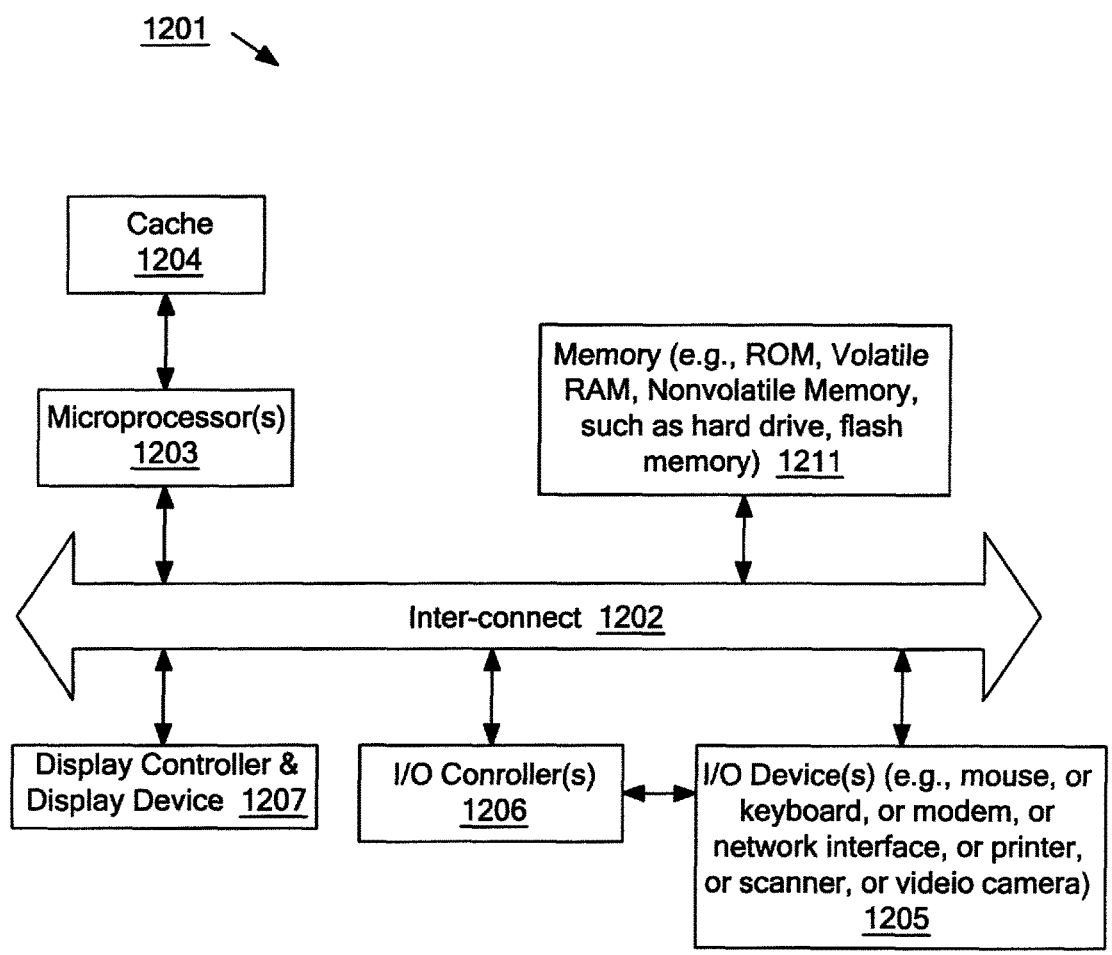
FIG. 12 shows a block diagram example of a data processing system which may be used with the present invention.

FIG. 12 shows a block diagram example of a data processing system which may be used with the present invention.

While FIG. 12 illustrates various components of a computer system, it is not intended to represent any particular architecture or manner of interconnecting the components. Other systems that have fewer or more components may also be used with the present invention.

In FIG. 12, the communication device (1201) is a form of a data processing system. The system (1201) includes an inter-connect (1202) (e.g., bus and system core logic), which interconnects a microprocessor(s) (1203) and memory (1211). The microprocessor (1203) is coupled to cache memory (1204) in the example of FIG. 12.

The inter-connect (1202) interconnects the microprocess(s) (1203) and the memory (1211) together and also interconnects them to a display controller and display device (1207) and to peripheral devices such as input/output (I/O) devices (1205) through an input/output controller(s) (1206). Typical I/O devices include mice, keyboards, modems, network interfaces, printers, scanners, video cameras and other devices which are well known in the art.

The inter-connect (1202) may include one or more buses connected to one another through various bridges, controllers and/or adapters. In one embodiment the I/O controller (1206) includes a USB (Universal Serial Bus) adapter for controlling USB peripherals, and/or an IEEE-1394 bus adapter for controlling IEEE-1394 peripherals.

The memory (1211) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment of the present invention, a server data processing system as illustrated in FIG. 12 is used in the processing system for a seller network to host seller network database, compute indicators of potential revenues for affiliates, track revenue generation and sharing for affiliates, provide interfaces for upload seller information, provide interfaces for affiliate reward reporting, and/or sorting seller listings for the affiliates, etc.

In one embodiment of the present invention, a server data processing system as illustrated in FIG. 12 is used in the processing system for an affiliate of a seller network to compute indicators of potential revenues, sorting seller listings according to indicators of potential revenues, provide seller listings to user terminals, and/or track revenue generation events, etc.

In one embodiment, a user terminal can be a data processing system similar to the system of FIG. 12, with more or less components. A data processing system as the user terminal can be in the form of a PDA, a cellular phone, a notebook computer, a personal desktop computer, etc.

Alternatively, the traditional communication client(s) may be used in some embodiments of the present invention.

1921 In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others, and transmission type media such as digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:

identifying, by a server system, a plurality of first advertisements, each having an indicator of potential revenue to a demand site owned by a supplier, wherein the indicator of potential revenue is based upon price information for each respective first advertisement and a first percentage of first revenue generated by a listing of the respective first advertisement, the first percentage to be received by the demand site according to a split of the first revenue between the demand site and a first plurality of sellers in a seller network, wherein the first percentage is determined based, at least in part, on each seller of the first plurality of sellers being supplied by the supplier;

identifying, by the server system, a plurality of second advertisements, each having the indicator of potential revenue to the demand site specified based upon price information for each respective second advertisement and a second percentage of second revenue generated by a listing of the respective second advertisement, the second percentage to be received by the demand site according to a split of the second revenue between the demand site and a second plurality of sellers in the seller network, wherein the second percentage is determined based, at least in part, on each seller of the second plurality of sellers not being supplied by the supplier;

sorting, by the server system, the plurality of first advertisements along with the plurality of second advertisements, according to the indicator of potential revenue to the demand site for each advertisement to create a sorted list, wherein the price information for each advertisement is based at least in part on a bid rate for each respective advertisement, and wherein sorting the advertisements is based on the bid rate multiplied by the percentage of revenue for each respective advertisement;

transmitting, by the server system, the plurality of first advertisements and the plurality of second advertisements, to a communication device, according to the sorted list for presentation via the demand site in response to detecting that the communication device entered a detected geographic area; and generating transmissions that establish connections for real time communications by routing at least one telephone call, in part by at least one voice over Internet protocol connection, between the server system and the communication device or other communication devices, the transmissions corresponding to at least one selection of an encoded phone number, via a user interface of a display device, from a set of advertisements presented via the demand site and displayed via the display device, the set of advertisements comprising one or more advertisements of the plurality of first advertisements and one or more advertisements of the plurality of second advertisements, the generating the transmissions comprising differentiating, based at least in part on encoded information received in the transmissions, one or more user responses directed to one or more sellers of the first plurality of sellers supplied by the supplier from one or more user responses directed to one or more sellers of the second plurality of sellers not supplied by the supplier.

2. The method of claim 1, further comprising: listing the sorted list in a media channel.

3. The method of claim 2, wherein the media channel is one or more of:
a hypertext transfer protocol server;
a wireless application protocol server; and/or a short message service based server.

4. The method of claim 1, further comprising:
listing advertisements of the plurality of first advertisements and the plurality of second advertisements according to the sorted list in a media channel.

5. The method of claim 4, wherein the bid rate is based at least in part on a charge per telephonic connection resulting from the listing of the respective advertisement.

6. The method of claim 5, wherein the bid rate is determined at least in part based on an indicator of likelihood of telephonic connections resulting from the listing of the respective advertisement.

7. The method of claim 6, wherein the indicator of likelihood of telephonic connections is based on a ratio of past telephonic connections and past listings of corresponding advertisements.

8. The method of claim 1, further comprising:
selecting from the sorted list for listing to a user in response to a search request from the user.

9. The method of claim 1, wherein the first percentage of the first revenue is different from the second percentage of the second revenue.

10. The method of claim 1, further comprising:
tracking, via the server system, revenues realized according to respective listings of an advertisement;
determining, via the server system, revenues realized by a revenue earning seller, wherein the revenue earning seller is a seller selected from one of the first plurality of sellers and the second plurality of sellers; and
presenting, via the server system, a report indicating the revenues realized by the revenue earning seller in response to a request from the revenue earning seller.

11. The method of claim 1, further comprising:
receiving, via the server system, from one seller of the second plurality of sellers, an advertisement for an advertising entity in the second plurality of advertisements.

12. The method of claim 11, wherein the one seller of the second plurality of sellers represents an individual person.

13. The method of claim 11, wherein the price information is based at least in part on revenue received by the advertising entity for one of a good and a service provided by the advertising entity based on the listing of the advertisement.

14. The method of claim 13, wherein the price information is based at least in part on one or more of:
a price for a product;
a price for a service; and/or
a price for an advertisement to sell one of a product and a service.

15. The method of claim 11, further comprising:
contacting, via a communication network, the advertising entity to join the seller network according to information received from the one seller of the second plurality of sellers; and
associating, via the server system, the advertising entity with the one seller of the second plurality of sellers when the advertising entity joins the seller network.

16. The method of claim 1, wherein the seller network sells at least one of a good and a service.

17. A non-transitory machine readable storage medium storing computer-readable instructions, that, when executed by a server system, cause the server system to:
identify a plurality of first advertisements, each having an indicator of potential revenue to a demand site owned by a supplier, wherein the indicator of potential revenue is based upon price information for each respective first advertisement and a first percentage of first revenue generated by a listing of the first advertisement, the first percentage to be received by the demand site according to a split of the first revenue between the demand site and a first plurality of sellers in a seller network, wherein the first percentage is determined based, at least in part, on each seller of the first plurality of sellers being supplied by the supplier;
identify a plurality of second advertisements, each having the indicator of potential revenue to the demand site specified based upon price information for each respective second advertisement and a second percentage of second revenue generated by a listing of the second advertisement, the second percentage to be received by the demand site according to a split of the second revenue between the demand site and a second plurality of sellers in the seller network, wherein the second percentage is determined based, at least in part, on each seller of the second plurality of sellers being not supplied by the supplier;
sort the plurality of first advertisements along with the plurality of second advertisements, according to the indicator of potential revenue to the demand site for each advertisement to create a sorted list, wherein the price information for each advertisement is based at least in part on a bid rate for each respective advertisement, and wherein sorting the advertisements is based on the bid rate multiplied by the percentage of revenue for each respective advertisement;
transmit the plurality of first advertisements and the plurality of second advertisements according to, a communication device, the sorted list for presentation via the demand site in response to detecting that the communication device entered a detected geographic area; and
generate transmissions that establish connections for real time communications by routing at least one telephone call, in part by at least one voice over Internet protocol connection, between the server system and the communication device or other communication devices, the transmissions corresponding to at least one selection of an encoded phone number, via a user interface of a display device, from a set of advertisements presented via the demand site and displayed via the display device, the set of advertisements comprising one or more advertisements of the plurality of first advertisements and one or more advertisements of the plurality of second advertisements, the generating the transmissions comprising differentiating, based at least in part on encoded information received in the transmissions, one or more user responses directed to one or more sellers of the first plurality of sellers supplied by the supplier from one or more user responses directed to one or more sellers of the second plurality of sellers not supplied by the supplier.

18. A server system comprising:
one or more servers; and
memory coupled to the one or more servers and storing instructions that, when executed by the one or more servers, cause the server system to:

identify a plurality of first advertisements, each having an indicator of potential revenue to a demand site owned by a supplier, wherein the indicator of potential revenue is based upon price information for each respective first advertisement and a first percentage of first revenue generated by a listing of the first advertisement, the first percentage to be received by the demand site according to a split of the first revenue between the demand site and a first plurality of sellers in a seller network, wherein the first percentage is determined based, at least in part, on each seller of the first plurality of sellers being supplied by the supplier;

identify a plurality of second advertisements, each having the indicator of potential revenue to the demand site specified based upon price information for each respective second advertisement and a second percentage of second revenue generated by a listing of the second advertisement, the second percentage to be received by the demand site according to a split of the second revenue between the demand site and a second plurality of sellers in the seller network, wherein the second percentage is determined based, at least in part, on each seller of the second plurality of sellers not being supplied by the supplier;

sort the plurality of first advertisements along with the plurality of second advertisements, according to the indicator of potential revenue to the demand site for each advertisement to create a sorted list, wherein the price information for each advertisement is based at least in part on a bid rate for each respective advertisement, and wherein sorting the advertisements is based on the bid rate multiplied by the percentage of revenue for each respective advertisement;

transmit the plurality of first advertisements and the plurality of second advertisements, to a communication device, according to the sorted list for presentation via the demand site in response to detecting that the communication device entered a detected geographic area; and generate transmissions that establish connections for real time communications by routing at least one telephone call, in part by at least one voice over Internet protocol connection, between the server system and the communication device or other communication devices, the transmissions corresponding to at least one selection of an encoded phone number, via a user interface of a display device, from a set of advertisements presented via the demand site and displayed via the display device, the set of advertisements comprising one or more advertisements of the plurality of first advertisements and one or more advertisements of the plurality of second advertisements, the generating the transmissions comprising differentiating, based at least in part on encoded information received in the transmissions, one or more user responses directed to one or more sellers of the first plurality of sellers supplied by the supplier from one or more user responses directed to one or more sellers of the second plurality of sellers not supplied by the supplier.

* * * * *